US009786253B2

(12) United States Patent
Raymond et al.

(10) Patent No.: US 9,786,253 B2
(45) Date of Patent: Oct. 10, 2017

(54) CONVERSION OF A DIGITAL STEREO IMAGE INTO MULTIPLE VIEWS WITH PARALLAX FOR 3D VIEWING WITHOUT GLASSES

(71) Applicant: Lumenco, LLC, Englewood, CO (US)

(72) Inventors: Mark A. Raymond, Littleton, CO (US); Hector Andres Porras Soto, Lakewood, CO (US); Kevin Karsch, Urbana, IL (US)

(73) Assignee: LUMENCO, LLC, Englewood, CO (US)

( * ) Notice: Subject to any disclaimer, the term of this patent is extended or adjusted under 35 U.S.C. 154(b) by 785 days.

(21) Appl. No.: 13/749,861

(22) Filed: Jan. 25, 2013

(65) Prior Publication Data

US 2013/0187910 A1   Jul. 25, 2013

Related U.S. Application Data

(60) Provisional application No. 61/632,523, filed on Jan. 25, 2012.

(51) Int. Cl.
*G06T 15/00* (2011.01)
*G09G 5/14* (2006.01)
(Continued)

(52) U.S. Cl.
CPC .............. *G09G 5/14* (2013.01); *H04N 13/004* (2013.01); *H04N 13/0011* (2013.01);
(Continued)

(58) Field of Classification Search
CPC .. G09G 5/14; H04N 13/0011; H04N 13/0014; H04N 13/0029; H04N 13/004; H04N 2013/0081
(Continued)

(56) References Cited

U.S. PATENT DOCUMENTS 8,111,906 B2 *   2/2012   Song et al. .................. 382/154
8,253,740 B2 *   8/2012   Varekamp et al. ........... 345/427
(Continued)

FOREIGN PATENT DOCUMENTS

EP   2393298        12/2011
EP   2544455 A1     1/2013
(Continued)

OTHER PUBLICATIONS

International Search Report and Written Opinion in PCT/US2013/02080 dated May 16, 2013 May 16, 2013.
(Continued)

*Primary Examiner* — Phu K Nguyen
(74) *Attorney, Agent, or Firm* — Marsh Fischmann & Breyfogle LLP; Kent A. Lembke

(57) ABSTRACT

A method for generating additional views from a stereo image defined by a left eye image and a right eye image. The method includes receiving as input at least one stereo image. The method includes, for each of the stereo images, generating a plurality of additional images. The method includes interlacing the additional images for each of the stereo images to generate three dimensional (3D) content made up of multiple views of the scenes presented by each of the stereo images. The interlacing may be performed such that the generated 3D content is displayable on a 3D display device including a barrier grid or a lenticular lens array on the monitor screen. The additional images may include 12 to 40 or more frames providing views of the one or more scenes from differing viewing angles than provided by the left and right cameras used to generate the original stereo image.

22 Claims, 14 Drawing Sheets

(51) Int. Cl.
*H04N 13/00* (2006.01)
*H04N 13/04* (2006.01)

(52) U.S. Cl.
CPC ..... *H04N 13/0029* (2013.01); *H04N 13/0404* (2013.01); *H04N 13/0409* (2013.01); *H04N 13/0415* (2013.01); *H04N 13/0447* (2013.01); *H04N 13/0014* (2013.01); *H04N 13/0422* (2013.01); *H04N 2013/0081* (2013.01); *H04N 2013/0092* (2013.01)

(58) Field of Classification Search
USPC ................. 345/419; 348/43; 382/154; 398/8
See application file for complete search history.

(56) References Cited

U.S. PATENT DOCUMENTS

| | | | | |
|---|---|---|---|---|
| 8,253,780 | B2* | 8/2012 | Raymond et al. | 348/51 |
| 8,411,931 | B2* | 4/2013 | Zhou et al. | 382/154 |
| 8,644,596 | B1* | 2/2014 | Wu et al. | 382/154 |
| 8,743,109 | B2* | 6/2014 | Blank et al. | 345/419 |
| 8,817,073 | B2* | 8/2014 | Wang | 348/43 |
| 8,849,012 | B2* | 9/2014 | Tamaru | 382/154 |
| 8,929,728 | B2* | 1/2015 | Zhong et al. | 398/8 |
| 2009/0116732 | A1 | 5/2009 | Zhou | |
| 2010/0231689 | A1 | 9/2010 | Bruls et al. | |
| 2010/0253917 | A1 | 10/2010 | Gao et al. | |
| 2011/0242279 | A1 | 10/2011 | Redert et al. | |
| 2012/0194905 | A1 | 8/2012 | Ushio | |

FOREIGN PATENT DOCUMENTS

| | | |
|---|---|---|
| WO | 2011043022 A1 | 4/2011 |
| WO | 2011108747 A1 | 9/2011 |

OTHER PUBLICATIONS

EP Search Report in PCT/US2013/023080 dated Feb. 2, 2015.
Office Action for European Patent Application No. 13741367.0, dated Oct. 14, 2016.
Fehn, et al, "Depth-Image-Based Rendering (DIBR), Compression, and Transmission for a New Approach on 3D-TV," Proceedings of the International Society for Optical Engineering (SPIE), vol. 5291, No. 2, May 31, 2004, pp. 93-104.

* cited by examiner

FIG.16

CONVERSION OF A DIGITAL STEREO IMAGE INTO MULTIPLE VIEWS WITH PARALLAX FOR 3D VIEWING WITHOUT GLASSES

CROSS-REFERENCE TO RELATED APPLICATIONS

This application claims the benefit of U.S. Provisional Application No. 61/632,523, filed Jan. 25, 2012, which is incorporated herein by reference in its entirety.

BACKGROUND

1. Field of the Description

The present invention relates, in general, to display of 3D imagery without use of glasses or special headgear, and, more particularly, to a method of generating multiple views from a stereo view or image stream (e.g., one used for displaying 3D images with polarized or shuttered glasses) to allow 3D viewing without the need for glasses or special headgear. The present invention may be thought of as relating to the automated conversion of digital files of stereo views into digital files of multiple views and to the operation of 3D displays to display 3D imagery to viewers. The conversion is "automated" through the use of software or a software program(s) running on a computer (e.g., a microchip conversion system), and the produced multiple views are, in some embodiments, adapted for display on a monitor or television (e.g., a liquid crystal display (LCD), plasma display, or other display/monitor device) that includes a barrier grid or lenticular lens sheet/layer (e.g., a monitor adapted for 3D viewing).

2. Relevant Background

Displays that provide the illusion of three dimensions have experienced a rebirth in the past few years. For example, a number of 3D televisions are now available for use in homes and home theaters. These 3D televisions generally operate by displaying a stream of left and right eye images in an alternating or time-multiplexed manner (e.g., left-right-left-right). Switching occurs so quickly that the viewer does not sense a flicker or change in the display. The viewer wears special headgear or glasses that operate in a synchronized manner with the display to only allow the light associated with the left eye image to reach the viewer's left eye and with the right eye image to reach the viewer's right eye.

For example, the 3D glasses may be shutter glasses that rapidly switch between allowing light to reach the left or the right eye, with the shuttering operation controlled to be time-synchronized with the display (e.g., a liquid crystal display (LCD) television monitor or the like). In other cases, the television monitor or display is configured to output two different types of polarized light to present the left and right eye images. In this case, the viewer typically wears glasses with two different lenses that are polarized in a manner to allow the left eye to view light from the display polarized in one manner and the right eye to view light from the display polarized in a second manner. Such polarized 3D glasses have been in use in theaters for many years.

While most commercial displays rely on the use of special glasses, it is generally agreed by those in the 3D entertainment industry that displays able to provide a 3D viewing experience without glasses or headgear offer significant advantages. Presently, there are 3D display systems that can deliver left eye images to a viewer's left eye and right eye images to a viewer's right eye. However, these 3D display systems each have significant limitations. Some 3D display systems require the viewer to have their head in a specific position and to not move at all during the viewing experience as this may cause the wrong image to be viewed (e.g., the right eye to see the left eye image stream or vice versa) or to lose the image altogether. For example, 3D televisions or the like may have a "sweet spot" where the viewed imagery appears in 3D such as directly in front of the center of the screen, but the volumetric effect is ruined if that viewer moves their head to the left or right even a small amount (e.g., several inches). As a result, such 3D display devices are only useful for one or two viewers viewing at a particular location.

To support existing 3D technologies, the accepted origination media has typically been stereo views such as for the production of 3D effects in movies, video games, and other applications. Stereo views (left and right eye views or images of an object or scene) are generated as a standard in the entertainment industry such as during filming or during rendering for animated movies and games (e.g., two cameras associated with a viewer's left and right eyes are used). In some cases, the views are compiled as an anaglyph by polarizing light by color and creating separation between the left and right eye images. The viewer can observe the 3D image by wearing a corresponding pair of glasses with red and blue filters (passive) or an active shutter system that selectively flashes/passes the left or right eye images in an alternating manner. Alternatively, a barrier grid or lenticular lens sheet/array can be used on a display device (e.g., placed on the front of an LCD or plasma display) to show two views to the viewer, which requires the viewer be centered perfectly with regard to the display device to experience a quality 3D effect.

The general public assessment of 3D viewing in gaming, television, and other applications is somewhat negative because of the necessity of wearing glasses or headgear or because of the very small "sweet spot" for viewing with a glasses-free 3D display device. Studies have, in fact, indicated that the glasses themselves are the primary deterrent to the acceptance to 3D media and displays. Hence, the goal of many in the entertainment industry is to develop 3D display technologies that do not require glasses or special headgear to create effective 3D effects for viewers. Preferably, such 3D display technology would also address or overcome the "sweet spot" or fixed head location limitation that exists with many 3D display devices as viewers want the freedom to move their heads without ruining the 3D effect and purchasers of the displays want to be able to view the displays with larger groups (e.g., allow a family to view a display while sitting side-by-side on a couch or in a row of a home theater).

SUMMARY

The inventors recognized that despite limitations with prior 3D display devices and 3D viewing that it is projected that over 80 percent of computing and communication devices (e.g., tablets, smartphones, laptops, desktops, minis, electronic readers, personal digital assistants (PDAs), and the like) will be capable of presenting stereo video and still imagery in less than 3 years. The inventors believe that the demand for 3D-capable devices will further skyrocket and gain wider acceptance when the 3D imagery is viewable from a wider viewing space or angle and not only when centered in front of the display screen.

With this in mind, it was recognized that presently the data needed to create more views does not exist in the presently available stereo data or information (e.g., in a file of left and right eye images associated with a video stream or a still image). More importantly, the needed views outside or wider than the views provided in the stereo views do not exist in the filmed 3D images (i.e., only left and right camera images) or in the animated 3D images (again, left and right eye cameras are used to render the imagery). To avoid a sweet spot or fixed viewing location problem, the views provided on a display device to allow viewing of a 3D image exceeds 2 views (single left eye and single right eye), and the set of views preferably may be 4 to 12 or more, with some implementation of the 3D technologies taught herein providing a more ideal number or amount of views (e.g., 20 to 40 views in the 3D display image set used to operate a 3D display device).

Further, the range of the views in the origination media should be wider or have more separation than the views currently provided in a stereo view (e.g., the common stereoscopic image is created by providing a left eye image and a right eye image separated by the average distance between viewers' eyes). This wider separation allows the 3D image to be viewed when the viewer moves left or right (moves about a room or when sitting in a variety of seats in a row or the like) or at different viewing angles (e.g., range of angles may be 45 to 135 degrees as measured from a viewing screen rather than only 90 degrees (i.e., an orthogonal and centered viewing location only allowing very small head movements)).

While creating intermediate views between the two stereoscopic images is helpful with the present inventive method, the automated conversion method provides a significant improvement by also creating views "outside" those provided by the input or original stereoscopic images. More parallax is needed as the rays to the viewer mix very quickly with the elimination of glasses/headgear in a lenticular lens array or barrier grid-based display device or system. A significant increase in parallax is needed as the stereo views input into the conversion method (or conversion module or software program executed by a processor(s)) only represent about 20 percent of desired parallax.

Briefly, the stereo-to-multiple view conversion method taught herein was developed based on the idea of using existing or previously created 3D media, e.g., media created with left and right images or stereographic images. The method converts this stereo or 3D media into multiple images automatically (without user/operator intervention although the operator may set parameters such as amount of parallax), and, in most embodiments, the method does not alter or change the existing origination method or material (e.g., animators or film makers can continue to produce 3D animated videos and movies with left and right images). In this way, original movies, such as the 3D version of Avatar or the like, can be used as the input media (set of stereographic images or 3D image stream) as well as any digital stereo creation in gaming and other entertainment industries.

The conversion method (or software module/program) in some embodiments may first convert the anaglyph back into traditional stereo (e.g., left and right eye images). The method then proceeds with identifying images as images within each frame of the image stream. Stereo information is then used to determine foreground and background elements/objects such as at the shape and/or pixel level. The method then involves shifting (or enlarging) the parallax information, and, in some cases, the amount of shifting/enlarging of parallax may be performed based on default settings or based on user input selecting a parallax value from a preset range (e.g., viewer's/operator's discretion to obtain a 3D effect useful with a particular 3D display device or to suit the viewer/audience).

Holes or gaps may be created in the data by moving the objects in the foreground and background to create the multiple views, and the method may include automatically cloning or synthesizing images to fill/close these holes or gaps such as by stretching the backgrounds and cloning pixels in the nearby image (image objects/elements). Such hole/gap filling may be done very quickly such as within microseconds with many available processors. The multiple views or images, e.g., 10 to 40 (or even up to 100 or more) rather than merely two as provided by stereo media, may then be interlaced as part of the conversion method, and the multiple views may be stored in memory and/or displayed on a 3D display device (e.g., an LCD or plasma display with a lenticular lens sheet or barrier grid) to allow a viewer to observe 3D static images or streaming video from multiple viewing angles (e.g., 45 to 135 degrees or the like relative to the display surface of the 3D display device).

According to one aspect of the invention, a software program is provided that converts stereo views or images (a right eye frame and a corresponding left eye frame of a movie/animation stream) into up to 100 or more views with complete automation for still images or streaming video. The multiple views are particularly well suited for viewing 3D imagery via a 3D display device that includes a barrier grid or lenticular lenses on an exterior surface of the monitor screen. The conversion program determines and uses the "convergent point" or intersection at which the images or pixels are in the focal plane, and the program recognizes both the shape/object (image element) outlines as well as the direction the pixels move relative to the two views (left and right eye images/views in stereo image) to determine foreground and background elements/objects.

Additional views are then synthesized by the conversion program between the two stereo images and to the right and left (extreme right and left, for example) of the two stereo images (input images or original/base images to be converted). The images are recognized and moved in the proper direction in the foreground or background in the creation of each new view by the conversion program. As a result, the vacant space around or behind an image element/object does not exist in the original information in the two views/image frames. The conversion program synthesizes this missing information such as by stretching the pixels surrounding the gaps/holes to fill in the missing data/information and creating a complete new view based on the original stereo pair of images.

After the conversion program creates the additional or multiple views, the set of images including the original two stereo images are interlaced (e.g., very quickly such as in microseconds). The conversion program can be used to generate still images or multi-view images from a stereo image (left and right eye images or frames) or to generate 3D video from a stream of left and right eye image pairs, and the multi-view images can then be displayed for viewing at a wide range of viewing positions or viewing angles such as with a 3D display device that has a lenticular lens array/sheet or barrier grid. The conversion program may provide a user interface or graphical user interface (GUI) that allows an operator/viewer to set or vary the amount of 3D by choosing a parallax or a parallax-related parameter to suit their viewing preferences or to achieve a desired 3D effect.

More particularly, a method is provided for generating additional views from a stereo image. The method includes executing a conversion module with a computer processor and, then, with the conversion module, receiving as input at least one stereo image of one or more scenes. In this latter step, each stereo image may include a left image associated with a left camera and a right image associated with a right camera. The method includes, for each of the stereo images, generating a plurality of additional images of the one or more scenes with the conversion module. Then, the method typically includes interlacing the plurality of additional images for each of the stereo images to generate a 3D content comprising multiple views of the one or more scenes for each of the stereo images.

In some implementations of the method, the interlacing is performed such that the generated 3D content is displayable on a 3D display device including a barrier grid or a lenticular lens array on or associated with a monitor. In the same or other implementations of the method, the plurality of additional images includes at least 12 frames (and often up to 40 or even up to 100 or more frames) providing views of the one or more scenes from differing viewing angles than provided by the left and right cameras. For example, the differing viewing angles may define an amount of 3D provided by the generating step and are viewing angles outside of a zone defined by the viewing angles of the left and right cameras. In one particular example, the differing viewing angles are selected from the range of 30 to 150 degrees relative to a focal plane.

According to another aspect of the method, the generating step may use a user-selected amount of parallax to create the plurality of additional images. Further, the method may include the step of determining a depth map providing a depth of each pixel in each of the stereo images, and, then, the generating step may be performed based on or using this depth map (defining a per-pixel disparity). Then, the method may include identifying objects in the one or more scenes that are in a foreground and in a background relative to a focal plane of the right and left cameras based on the depth map. In such implementations of the method, the generating step may involve moving the identified objects based on whether the identified objects are in the foreground or in the background.

Further, according to another aspect of the method, the generating step may include identifying a hole in one of the additional images and repairing the identified hole. For example, such a hole or gap may be a plurality of missing pixels, and, then, the repairing step may include providing the missing pixels by cloning pixels proximate to the missing pixels in the one or more scenes or by stretching an object adjacent to the identified hole. In a practical application, the input to the conversion program includes a 3D movie or a 3D animated video comprising 20 to 24 frames per second, and the frames each provide a pair of the left and right images for the one or more scenes. In some cases, the input includes anaglyph information, and the method includes, prior to the generating step, processing the input to convert the anaglyph information into the left and right images.

BRIEF DESCRIPTION OF THE DRAWINGS

FIG. 16 illustrates a matrix of pixels of a display screen with the frames associated with each pixel provided by frame number.

DETAILED DESCRIPTION

Figure 1:
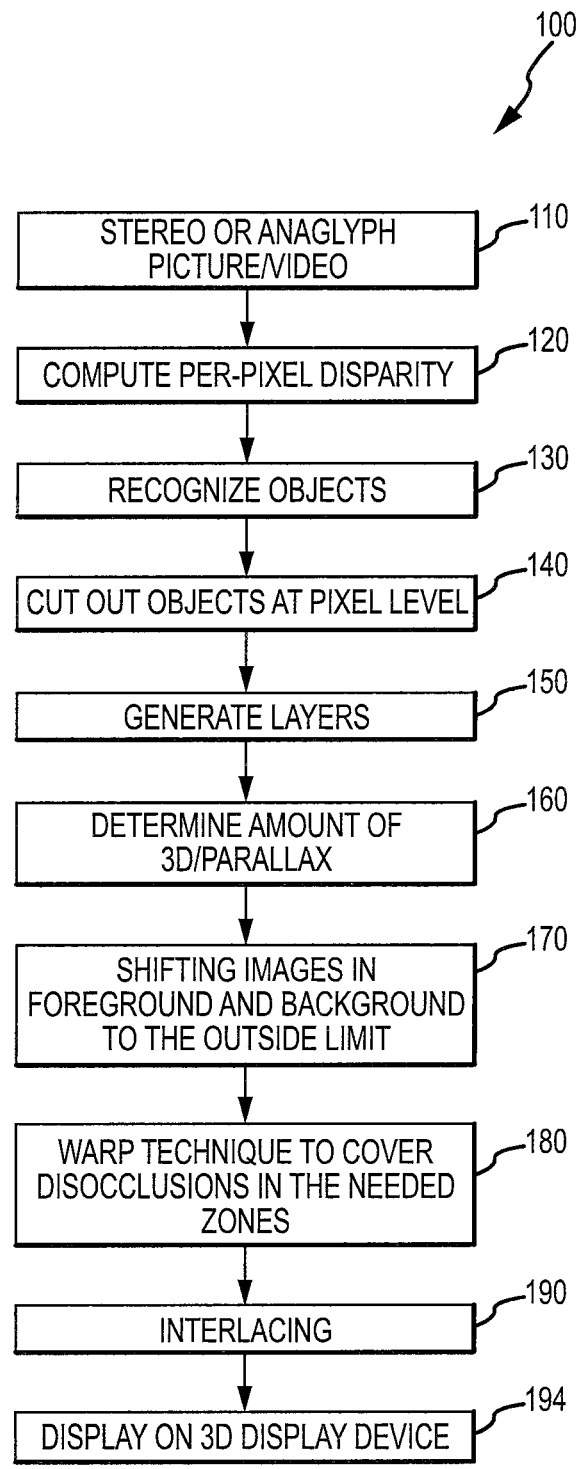
FIG. 1 is a flow diagram of an exemplary stereo image to multiple images/views conversion method such as may be carried out by a conversion program as described herein.

Briefly, the present description is directed toward a method for converting a conventional stereographic image provided with left and right eye images or views into multiple views or images to allow 3D viewing from multiple viewing locations without the need for special glasses. The method may be implemented using software that may be embedded in and/or run by hardware in a gaming device, a computer (desktop, laptop, tablet, mini, smartphone, PDA, and so on), an offline intermediary device, a DVD player, a 3D display device, or the like. The software (e.g., a conversion program) may first recognize the anaglyph information and convert the information back into traditional colors and stereo views while in some cases the input image stream may be a stream of left and right eye or stereo images (not yet processed for viewing with glasses/headgear).

The conversion program/module then recognizes or identifies each of the two stereo images (left eye image and right eye image, for example). The conversion program does a virtual "shift" between the two stereo images in which the convergent point is recognized or identified (e.g., the pixels are identified that do not shift and are identical between the two images). The conversion program is configured to use the convergent point as an "axis" or virtual "X" when the image shift is viewed from above (looking down at the shift). The inventors understood that images (pixels) in the background move in the opposite directions in the foreground and in the background, which is used to compute per pixel disparity.

Then, using the per-pixel disparity, the conversion program estimates the approximate depth (e.g., 1/disparity may be used to calculate depth up to some unknown scale) of each pixel. Then, using the depth, the conversion program acts to localize each pixel in 3D using its pixel coordinate (x,y) and its depth value (z), which produces a 3D set of points corresponding to the scene represented by the input/original two stereo images. Then, the conversion program produces a dense 3D reconstruction of the scene, e.g., by interpolating the grid of the 3D points of the scene. This 3D reconstruction of the scene can be viewed by a synthetic/digital camera provided by the conversion program, and the camera can be placed or oriented at any angle. Views of the scene from different viewpoints produce "shifted" images that are unique or differ from the original/input stereo images.

If any holes exist in the 3D reconstruction of the scene or the "mesh" (such as due to sharp discontinuity between 3D vertices), the created views will leave gaps or discontinuities in the backgrounds as the synthetic camera is rotated or moved through different viewing angles. The conversion program is further configured to fill or repair these gaps/discontinuities. In one example implementation, the conversion program performs this step/function by warping, stretching, and/or cloning the pixels (e.g., pixels near or surrounding the identified gap/discontinuity) to fill in the missing data with similar surrounding data or information for each created view or image.

The images/views created by the conversion program are then interlaced together at a particular mathematic, which may be chosen to match the barrier grid (or lenticular lens array) pitch or frequency (of the 3D display device used to display the multiple images/views) and to match the optical pitch of the information (e.g., how the rays meet the viewer). The viewing distance is typically calibrated within the conversion program to match the exact optical pitch to the real life viewing environment so as to automatically adjust to the viewer's desires. This may be done at the time the viewer selects the amount of 3D (in the GUI, for instance) that the viewer desires for the multiple views (set of additional images being created from the original/input stereo image set).

FIG. 1 illustrates a method 100 performed by a conversion program/module of the present description to create a set of multiple views from an input stereo image (e.g., a left eye image and right eye image), and the method 100 can be used to create a static 3D image viewable from many viewing angles without glasses/headgear. In other cases, the method 100 can be repeated for each frame of a movie/animated clip/video/video game (3D image stream) to create a 3D video that has multiple views and can be viewed from numerous locations (head can be moved side to side or the like).

The method 100 performs the steps discussed above in detail beginning at 110 with an input image set being provided that may include a stereo picture or video (plurality of frames each including a left and right image pair) or a data set with anaglyph information (e.g., image or video prepared for viewing through 3D glasses). If needed, the step 110 may involve the conversion program recognizing the anaglyph information and converting the information back to traditional colors and stereo views.

At 120, the method 100 includes computing the per-pixel disparity. The method 100 may then include at 130 identifying objects or elements in the image data, and then at 140, the method 100 may include cutting out the objects/elements at the pixel level. Then, at 150, the method 100 includes generating layers or creating a 3D reconstruction of the scene. At 160, the method 100 includes determining an amount of 3D or parallax to use to create the multiple views, and this value may be input by a user/operator of a computing device running the conversion program.

Then at 170, the method 100 includes shifting images in the foreground and background to an outside limit as part of generating the multiple views. At 180, the method 100 may include performing a warp or other technique to cover disocclusions or gaps in each of the multiple views (as needed). The method 100 continues at 190 with interlacing the multiple views/images (each associated with differing viewing angles (e.g., 3 to 5 degree shifts through a desired viewing range of such as 45 to 135 degrees) to provide 20 to 40 or more views). Then, at 194, the method 100 continues with displaying the still 3D image or 3D video/animated film to a viewer (who does not need to wear special 3D glasses) via a 3D display device such as a monitor screen on nearly any electronic device that has a lenticular lens array/sheet or a barrier grid (and the interlacing may be chosen to suit the particular lenticular lens array or barrier grid in some embodiments).

The conversion method described above is designed to generate multiple views from an input stereo image or video. The conversion method or algorithm may be described as follows. Given a stereo input image, the method first involves computing per-pixel disparity, and this may be accomplished in a variety of ways such as, but not limited to, the efficient stereo matching technique described in Geiger et al. (Andreas Geigher, Martin Rosen, and Raquel Urtasun, "Efficient Large-scale Stereo Matching," in Asian Conference on Computer Vision (ACCV), Queenstown, New Zealand, November, 2010, which is incorporated herein by reference). Other methods used to match image regions (not particularly designed for "stereo matching") can also be used to this end such as the optical flow method of Brox et al., (Thomas Brox, Andres Bruhn, Nils Papenberg, Joachim Weickert, "High Accuracy Optical Flow Estimation Based on a Theory for Warping," in European Conference on Computer Vision (ECCV), pages 25-36, 2004), which is incorporated herein by reference.

Then, using the original images and computed per-pixel disparity, the conversion algorithm may use an image warping technique (such as a variant of the image warping technique described by Wang et al. (O. Wang, M. Lang, M. Frei, A. Hornung, A. Smolic, and M. Gross, "StereoBrush: Interactive 2D to 3D Conversion Using Discontinuous Warps," in Sketch-Based Interfaces and Modeling Symposium, 2011, which is incorporated by reference herein)) in order to generate multiple views of the scene from a preset number of new viewpoints (viewing angles) The generated images can then be used as content for a 3D display device. The conversion algorithm(s) taught herein was chosen because it is efficient in computing new views and accurate enough that errors are hard to spot in a video sequence (e.g., where images are flashed for fractions of seconds).

Figure 2:
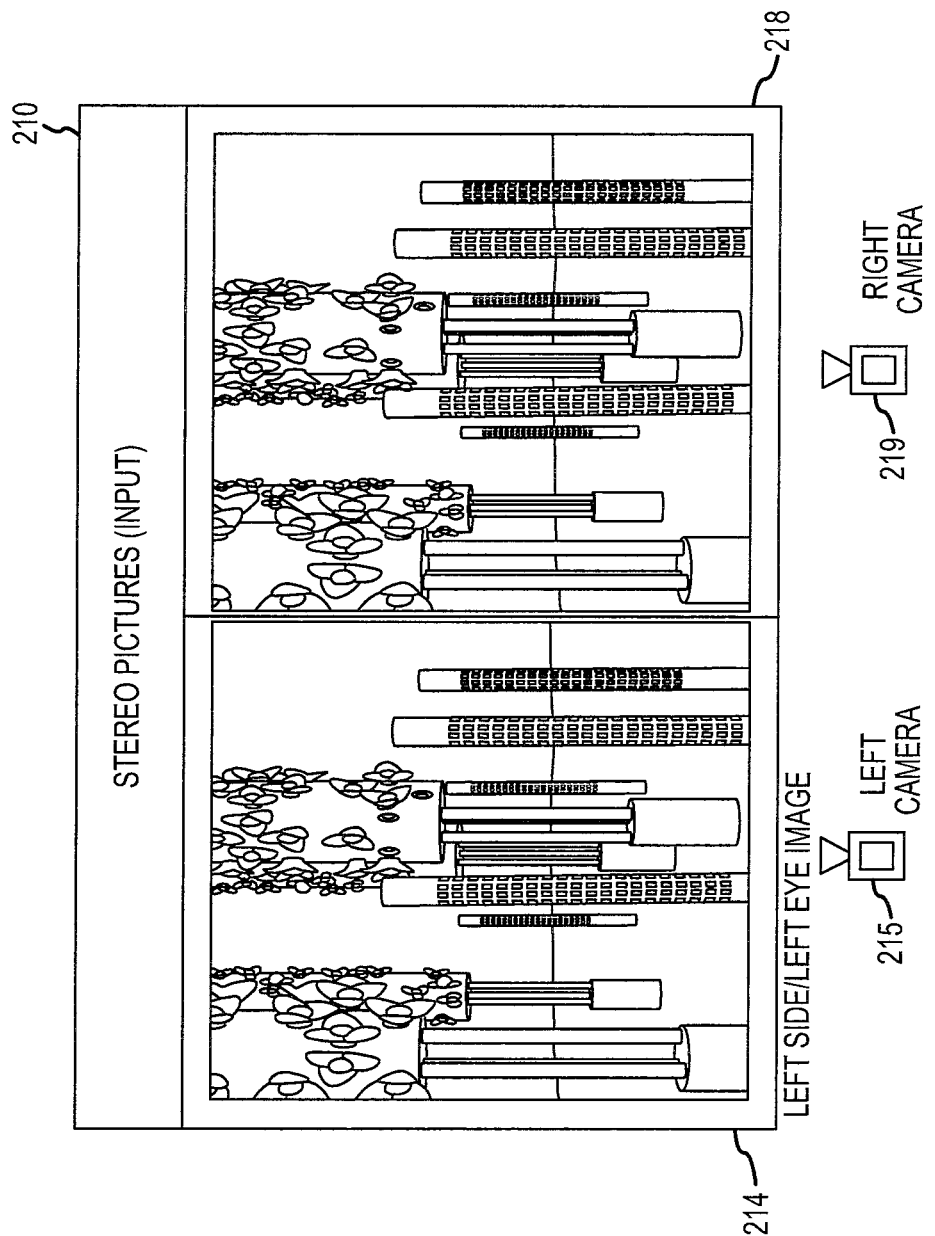
FIG. 2 illustrates a stereo image (input to the conversion program/method) made up of a left eye image and a right eye image.

At this point in the description, it may be useful to work through one particular example of use of the conversion method of the invention. FIG. 2 illustrates a stereo image or input 210 for a conversion method (such as method 100 of FIG. 1). As shown, the stereo image 210 is made up of a left side/eye image 214 provided by a left side lens/camera 215

(which may be a synthetic or real camera depending on whether the image 214 is an animated image or photographic image/picture) and a right side/eye image 218 provided by a right side lens/camera 219. As is well known in the entertainment/visual arts industry, the left and right cameras 215, 219 typically are spaced apart about the distance between the average human eyes to simulate 3D vision of a human. The images 214, 218 are typically digitized or stored in memory, and then later retrieved by or fed as input to the conversion module or program running on a computing device.

Given a pair of stereoscopic images 214, 218 (i.e., side-by-side pictures of a scene taken from roughly the same viewpoint by cameras 215, 219), a goal for designing the conversion method/software is to synthetically generate numerous unique images (differing from the images 214, 218 in view point) from nearby viewpoints. In computer vision literature, this is known as new view synthesis, which is a form or image-based rendering that has recently received significant amounts of attention. The inventors propose several methods for synthesizing arbitrary views of a scene given only a pair (or fixed number of pairs) of stereo images (such as image 214 and image 218). The conversion software/program uses these techniques to generate truly 3D-viewable media/content, which may be interlaced for display via barrier grids or lenticular lens arrays on a 3D display device.

In order to generate the new views/images, the conversion program first needs to know or determine the structure of the scene. In other words, the program has to know or determine where objects/elements of the scene are located, how far away are they from the camera(s), and what the scene looks like behind foreground objects. To this end, the conversion program may use cues from the image pairs (stereo input) to obtain all of this information. Then, the conversion program can use a variety of image-based rendering techniques to render (e.g., synthetically image) the synthesized scene information from new viewpoints (or viewing angles or camera locations/orientations) to create content from a number of viewing angles.

With regard to identifying scene structure/objects in the image pairs/stereo input, an initial goal may be to use computer vision techniques to estimate properties of the scene using only an input stereo image (or video made up of a large number of such stereo images). These estimated properties include, but are not limited to, the 3D positioning of scene objects/elements with respect to the camera, and the grouping of pixels into objects/elements (e.g., segmentation). To this end, one may focus on new view synthesis using stereo images, which achieves more accurate results more efficiently.

One useful method for estimating scene structure is known as stereo matching. Given a stereo image pair (such as images 214, 218 of FIG. 2), stereo matching algorithms (which are known to those skilled in the arts, and, since there exist many readily available algorithms they are not explained in great depth in this description) attempt to match corresponding pixels, such as by using epipolar constraints, to find the pixel-wise (or per-pixel) disparity between the two stereo images. The disparity (or the distance between where the same point in space projects to each of the image planes) can be used as a rough measure of depth, which allows the conversion program to determine or calculate how far away objects/elements are from the cameras (e.g., up to a missing scale factor).

Object segmentation could also be seen or thought of as a form of scene structure estimation. Salient objects could be segmented using an automatic approach and assumed to be foreground objects. Thus, when generating new views from the stereo pair, these objects will have more parallax than the background or background objects, which makes the 3D effect more prominent for these objects. There are numerous automatic segmentation approaches that leverage stereo information that may be used for this purpose. In some cases, though, instead of assuming that these segmented objects are in the foreground, this technique may be coupled with the above mentioned stereo matching technique to estimate the disparity for entire objects (e.g., instead of determining per-pixel disparity).

Once the 3D positions of pixels and/or objects have been extracted from the stereo images (using stereo matching or other techniques), the conversion program can use this information to generate new views of the scene (shown in the input stereo images). The new views/images were not originally captured in the original stereo images. In one implementation, the conversion program may synthesize new views of the scene by re-projecting these 3D points (and associated pixel colors) to other viewpoints. The primary issue, though, with this technique is that holes will appear in the synthesized images caused by disocclusions, i.e., parts of the scene that are hidden by foreground objects in one image but that reappear in nearby views.

To address this issue, the conversion program may fill these holes or gaps using linear interpolation or Poisson blending (e.g., solving Laplace's equation to minimize gradients in the hole regions). In other implementations, though, inpainting may be used, and, in cases where two or more views exist of the scene, occlusion information may be found in other frames and used to fill the holes/gaps in the new views. These methods can produce plausible or useful results, but many of these methods may produce unnatural and/or undesirable artifacts near occlusion boundaries and inside disoccluded regions. There are also existing methods that do so without leveraging the structure present in the stereo images (e.g., view interpolation, monocular depth estimation, and the like). However, these techniques generally underperform other stereo-based methods in terms of accuracy and efficiency as they use less information.

Another alternative would be for the conversion program to use a form of image warping. As mentioned above, Wang et al. developed a method that takes as input a single image and per-pixel disparity values (which the conversion program typically obtains automatically prior to the step of generating multiple images) and intelligently warps the input image based on the disparity such that highly salient regions remain unmodified. The idea is that people (viewers) are less perceptive of errors in low saliency regions, and, thus, disocclusions are covered by stretching the input image where people/viewers are less likely to notice artifacts. In the past, the warping technique was only used for single RGBD images, but the inventors propose to extend the warping method to video sequences and also utilize information present in the stereo images to improve the warping results (e.g., use the per-pixel disparity to provide a variant or improved image warping technique).

Figure 3:
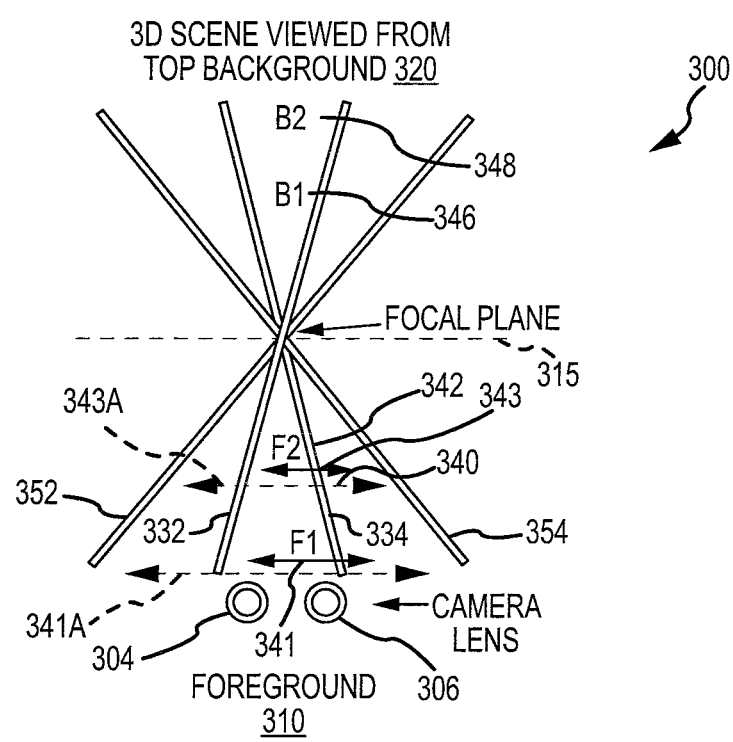
FIG. 3 illustrates schematically a stereo image that may be input to a conversion program/method and information that can be obtained from the stereo image to create multiple images.

FIG. 3 illustrates schematically a stereo image that may be input to a conversion program/method and information that can be obtained from the stereo image to create multiple images. Particularly, FIG. 3 shows a 3D scene 300 as viewed from above (or looking downward into the 3D scene). The 3D scene 300 may initially be defined by data captured from camera lenses 304, 306 (left and right cameras). The camera lenses 304, 306 are positioned within the foreground 310 of the scene 300 and are used to collect data on the foreground objects/elements 340, 342 (or F1 and F2 in FIG. 3) as well as background objects/elements 346, 348 (or B1 and B2 in FIG. 3). The focal plane 315 of the 3D scene 300 as defined by the camera lenses 304, 306 is shown to divide the scene 300 into the foreground 310 and the background 320.

The two stereo views provided by cameras 304, 306 can be thought of as defining a zone as shown by lines 332, 334, with a portion of the zone in the foreground 310 and a portion of the zone in the background 320. Objects or elements 340, 342 are elements in the foreground 310, but element 340 is closer to the viewer (cameras 304, 306) such that the element 340 moves side-to-side a larger distance than element 342 when the scene 300 is observed by a viewer as is shown by the arrows 341, 343 near the objects/elements 340, 342 in FIG. 3.

Objects/elements 346, 348 are in the background 320, but object 348 is farther away from the viewer/cameras 304, 306 such that it moves more than object 346 (e.g., relative movement to a viewer when the viewer changes their view point or head location varies with depth of the objects (or their pixels) within the 3D scene 300). Further, the elements 340, 342 in the foreground 310 move in opposite directions relative to the elements 346, 348 in the background 320. Objects that are located at or proximate to the focal plane 315 do not move at all in the various views of the 3D scene 300. In one exemplary viewer movement or viewing sequence, the background elements 346, 348 may move to the left while the foreground elements 340, 342 move to the right.

While the two stereo views provided by camera lenses 304, 306 define a viewable zone (e.g., defined to be within the boundaries provided by lines 332, 334), the conversion program/method described herein is configured to expand the scene 300 to provide a much larger viewing zone such as that defined in the foreground 310 and background 320 within boundary lines 352, 354. In this larger zone provided by lines 352, 354 (outside the zone of lines 332, 334), the objects 340, 342, 346, 348 have more parallax. This increase in parallax is shown with dashed arrows 341A and 343A for foreground images 340 and 342, and the amount of parallax increase from a stereo view to a multi-image view (as shown by comparing line 341 to 341A and line 343 to 343A) may be a default setting of the conversion program/method or be adjusted/modified via a GUI by an operator of the conversion program.

The information provided within the original stereo pictures of 3D scene 300 provided by camera lenses 304, 306 is used by the conversion program/method to: (1) recognize or identify the objects/elements 340, 342, 346, 348; (2) calculate the parallax to go from the original limits/boundaries 332, 334 to the multi-view limits/boundaries 352, 354 with more parallax; and (3) determine if each of the elements 340, 342, 346, 348 is in the focal plane 315, in the background zone 320 or foreground zone 310, and how far each object (or each of its pixels) is from the viewer/camera lenses 304, 306 (e.g., to provide pixel-by-pixel depth or per-pixel disparity for the 3D scene 300).

Figure 4:
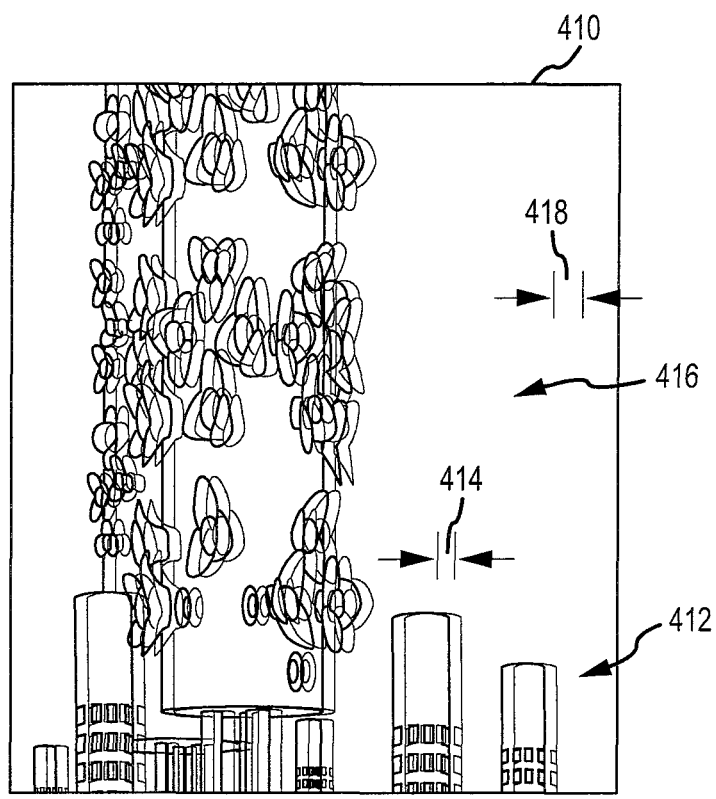
FIGS. 4 and 5 illustrate the scene or 3D image created by overlaying the images of FIG. 2 and illustrate an exemplary additional view (one of a set of multi-views) generated by the conversion program from the stereo image pair, which shows original parallax and parallax provided to objects/elements in additional view.

FIG. 4 illustrates a stereo image (left and right images viewed/displayed concurrently) 410 (e.g., the images 214, 218 of FIG. 2 displayed concurrently to a viewer). As shown (without glasses), the foreground objects/elements 412 have a first parallax 414 provided by the 2 stereoscopic images, and the background objects 416 have a second parallax 418 provided by stereo images providing the image 410.

Figure 5:
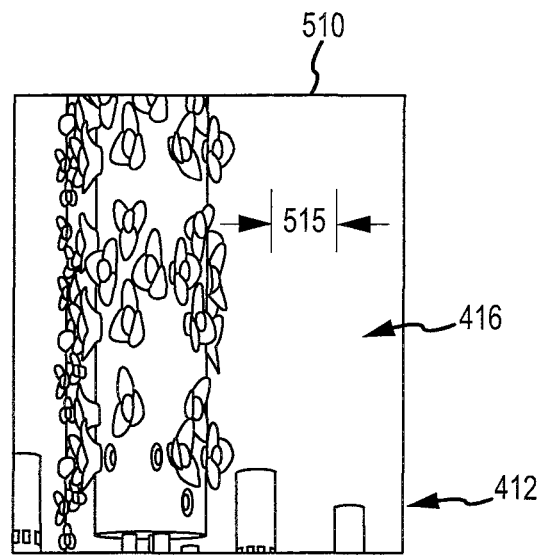

FIG. 5 illustrates one of the multi-views 510 that can be generated from the image 410 (or stereo images corresponding to view 410). The image 510 is useful for showing that a third parallax value 515 that is larger than parallax values 414, 418 is used to achieve a clear and pleasing view 510 from image 410 (outside the viewing angle provided by the stereo images providing view 410). In other words, the image 510 shows the needed amount/quantity of parallax 515. In the image or view 510 (one of the multi-views created by the conversion program/method described herein), the foreground elements 412 and background elements 416 are displaced a determined amount by the conversion program (with the displacement for each element 412, 416 generated by the software) when creating/generating the additional views (or multi-views from a single stereo image/view).

Figure 6:
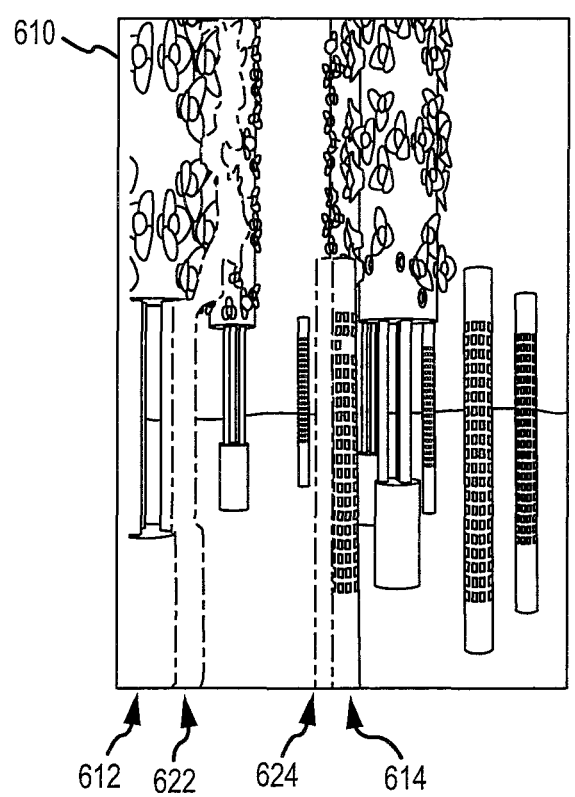
FIG. 6 illustrates a multi-view in its initial stage of generation from left and right eye images of a stereo image input showing that information is unavailable from the input (e.g., the multi-view initially has missing pixels)

FIG. 6 illustrates an additional view (one of many multi-views) 610 that may be created by the conversion program from the input stereographic image (or left and right eye image pair). In the additional view 610, a number of foreground images/objects 612, 614 are provided; however, the image 610 shows that gaps or holes 622, 624 are present in the image 610 (or its data). The holes or gaps may be thought of missing pixels or sets of missing pixels from the stereo images that are identified or "uncovered" by adding parallax in the outside views (views outside the zone defined by the left and right camera lenses, as discussed above). In other words, the moment the conversion program cuts the identified objects/elements and moves them in order to generate the desired/set parallax to provide a new view that differs from the original two there is missing information and/or pixels 622, 624 that are readily apparent in the created additional view 610.

Figure 7:
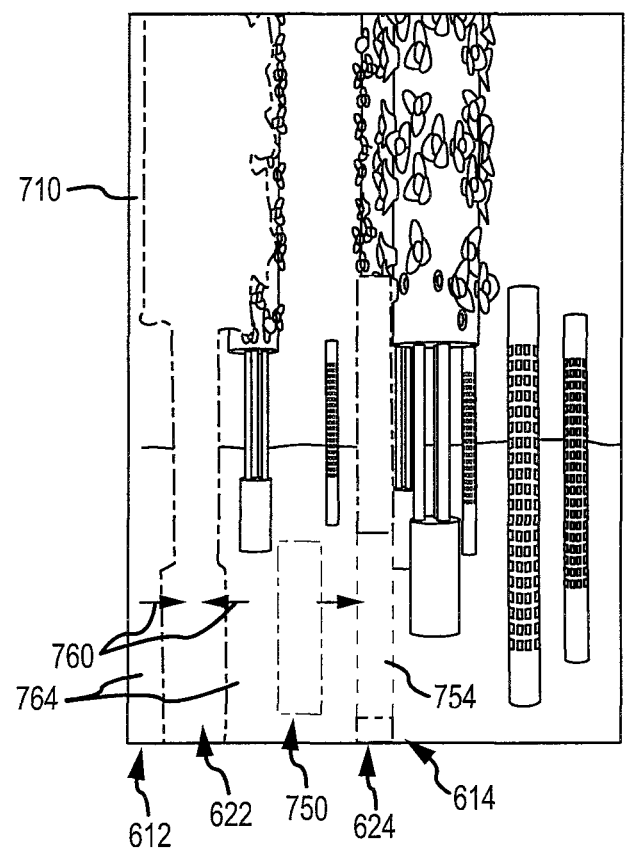
FIG. 7 illustrates the additional view or multi-view image of FIG. 6 during the process of filling or repairing holes or gaps identified in the generated new view/image from the stereo image input.

FIG. 7 illustrates the step or process (or steps and processes) that may be performed by the conversion program to correct for or overcome the problem with missing information or pixels. In FIG. 7, the additional view or image 710 is shown to include the gaps or sets of missing pixels 622 and 624 near foreground objects/elements 612, 614 that have been identified by the conversion program. In order to cover up or disguise the gaps/holes, each of these objects may be enlarged a little such as by expanding the size of an object (its number of pixels) when a gap or hole is identified nearby. This will often be adequate to cover or hide smaller holes or gaps.

In other cases, adjacent zones or identified objects 750 nearby a set of missing pixels may be cloned and then inserted for the missing pixels as shown at 754. This may involve determining the size and shape of the hole (identifying the missing pixels), determining a similar set of pixels among the nearby or adjacent objects or elements (here, nearby foreground image element 750 was chosen), and cloning or copying these pixels into the mesh/image 710 at the location of the missing pixels. In other cases, the nearby zones 760 bordering a hole/gap 622 are stretched 764 at the edge of the hole/gap 622 together to cover and fill the hole or gap 622. Such stretching may be acceptable for some gaps/holes as the stretching or distortion 764 of the pixels 760 may not be visually detectable by a viewer or may provide an acceptable result.

Figure 8:
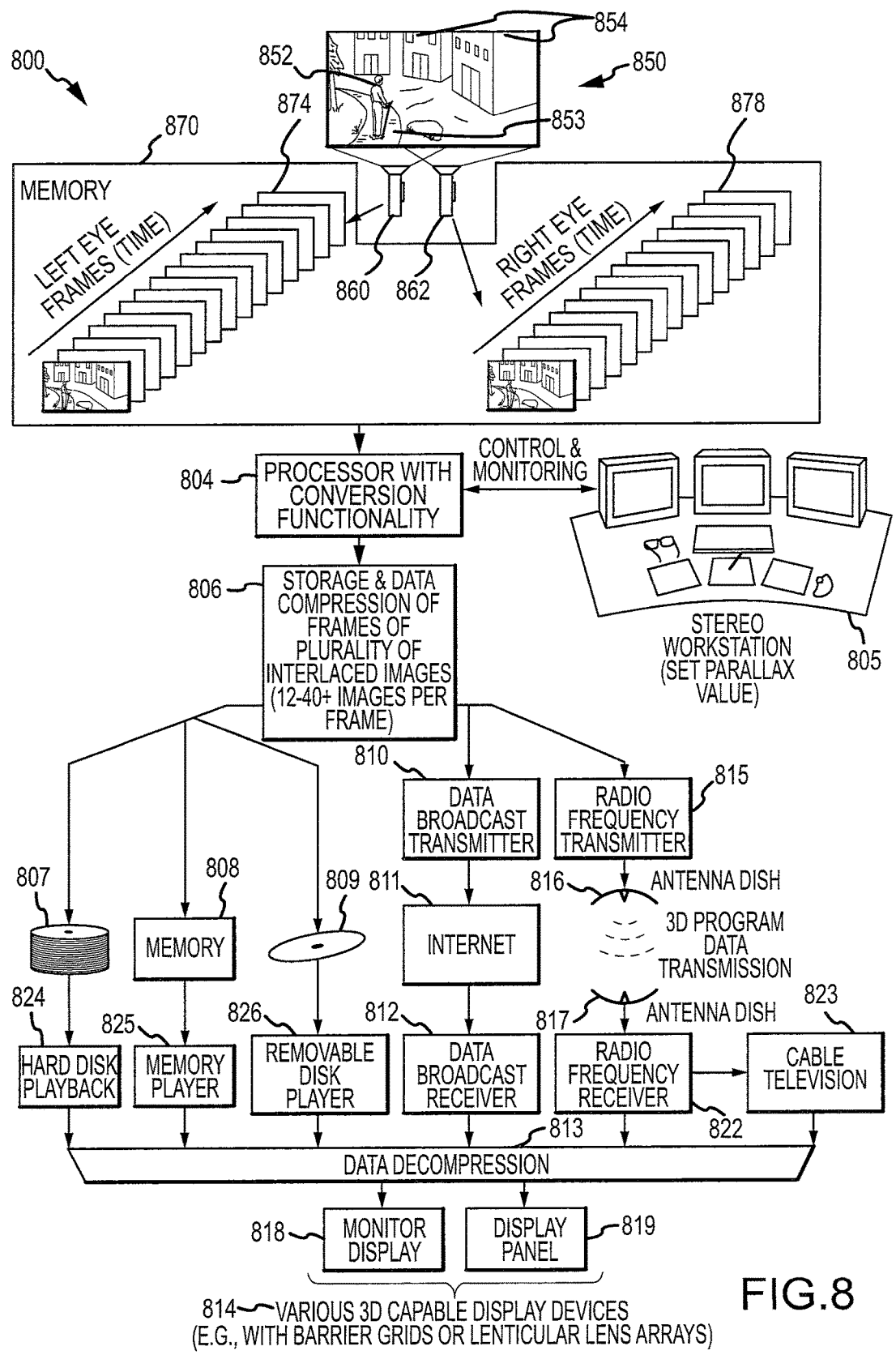
FIG. 8 is an embodiment of a multi-view media or content generation and distribution system with a processor configured to perform at least a portion of the stereo to multi-view conversion and interlacing process or method described herein.

FIG. 8 illustrates a representative multi-view content/media generation and distribution system 800 that may be used by a program user or operator or viewer to produce one or more frames with a plurality (12 to 40 or more interlaced) of images or views each provided at a differing viewing angle. The system 800 includes content 850 (e.g., digital still, video, and/or animated frames ready for display with glasses and including anaglyph information or left and right eye images/frames) with foreground objects 852 (such as characters, framing elements, and the like) and background objects 854 (e.g., objects behind the foreground objects such as other characters, landscape elements, and the like).

The content or animated/modeled scene 850 is filmed or rendered based upon position and other parameters (such as lens setting, axis, toe in, and the like) of a pair of virtual or real cameras 860, 862. For example, in video game or 3D animated movie applications, the content from the cameras 860, 862 may be rendered by a 3D graphics processor and is stored (or digitized and stored in some live action implementations) in memory 870. As shown, the rendered or filmed content is stored as a plurality or set of frames or images 874 arranged in a time order for the left eye (i.e., left eye images or a left eye image stream) and a plurality or set of frames or images 878 for the right eye (i.e., left eye images or a right eye image stream). Typically, upon initial rendering the number of frames are equal in each set 874, 878 and are arranged in the same time order, e.g., a frame in set 874 will correspond to a paired or corresponding frame in set 878 such that a similar content 850 is shot or rendered at a particular point in time but from a differing perspective or position of cameras 860, 862.

The system 800 includes a processor 804 (e.g., one or more processors or CPUs running graphics and other software/algorithms described herein) to convert the single pair of images 874, 878 for each frame (e.g., original 2 views of the scene/content 850) into multiple images/frames each from a different or new view (e.g., new camera angle/position without use of cameras or additional filming/rendering). Control and monitoring of the operation of the processor 804 is performed via a stereo workstation 805 and may include a user (e.g., an animator or a stereographer) operating or interacting with the processor 804 such as to enter or adjust the parallax value or the optical pitch to suit the viewing space or 3D display device (or to select the method(s) used to fill/repair any identified holes/gaps in created additional views). In the illustrated exemplary system 800, the processor 804 is implemented and controlled by a user working at a stereo workstation 805 at which the user may access an interactive user interface and image processing tools and may, in some embodiments, control and monitor the results of the processor 804 (e.g., as it runs to select and adjust depth and/or disparity relationships of elements/objects of the image sets 874, 878 being identified in content 850). The functions implemented by the processor 804 may be performed by one or more processors/controllers or microchips. Moreover, these functions can be implemented employing a combination of software, hardware and/or firmware taking into consideration the particular requirements, desired performance levels, and the like for a given system or application.

The workstation 805 may include multiple monitors, three-dimensional glasses, and one or more user input mechanisms such as a keyboard, a mouse or trackball, drawing tablet(s), and a drawing pen. The workstation 805 may also include a processor that provides signals to the monitors, controls the visual displays at these monitors, and receives and processes user inputs provided to the system via the user input mechanisms, e.g., controls the interactive interface or the like. The processor may provide a three-dimensional (3D) image at an application monitor that is 3D enabled with a barrier grid or lenticular lens array on a display/monitor screen, which is updated to allow the user to observe changes in the depth and/or parallax utilized. In some embodiments, an interface may be provided to allow an operator to select one or more conversion parameters including, but not limited to, parallax and optical pitch.

The multi-view images or frames with multiple additional views at differing viewing angles may be stored via storage and data compression 806 performed by processor 804. The images or files may be stored on hard disk, on tape, or on any other form of data storage. In the interest of conserving space on the above-mentioned storage, the digital data of the images may be compressed otherwise files sizes can become large especially when dealing with a full-length animated work or digitized live action film. Data compression also may be desired when the information passes through a system with limited bandwidth, such as a broadcast transmission channel.

The multi-view images or content, after processing by processor 804 and/or workstation 805, can be stored in many forms. The image data can be stored on a hard disk 807 such as for hard disk playback 824, in removable or non-removable memory 808 such as for use by a memory player 825, or on removable disks 809 such as for use by a removable disk player 826, which may include but is not limited to digital versatile disk (DVD) players. The primary and alternate eye images (or stereoscopic images) can also be compressed into the bandwidth necessary to be transmitted by a data broadcast receiver 810 across the Internet 811 or other digital communications network, and then received by a data broadcast receiver 812 and decompressed (e.g., via data decompression 813), making it available for use via 3D-capable display devices 814. Similar to broadcasting over the Internet 811, the primary and alternate eye images (or stereoscopic images) created by the methods described herein can be transmitted by way of electromagnetic or RF (radio frequency) transmission by a radio frequency transmitter 815. This includes direct conventional television transmission as well as satellite transmission employing an antenna dish 816. The images can also be transmitted by satellite and received by an antenna dish 817, decompressed, and viewed on a monitor display 818, possibly incorporating a LCD or plasma display with a barrier grid or lenticular lens array or a display panel 819. Another use for the multi-view content produced by the inventive processes is distribution via cable television 823.

At this point in the description, it may be useful to discuss further the concept of creating a video depth map, which may involve looking for time coherence. The conversion program, and systems described, may be configured to create depth maps from the stereo image input. The creation of depth maps may take into account that the goal is not just to provide a single or an independent stereo image but, instead, is typically to provide a sequence of 3D images or frames (24 per second in film, for example). All of these images or frames together provide the information and digital cues to generate the 24 "sets" of frames per second.

With this in mind, the stereo input or content provided to the conversion program/method may be a series of stereo images where each one has to be converted to several or a plurality of views that finally will be used to generate a sequence of interlaced files (each frame/image is an interlaced set of multi-views, as discussed herein). Hence, the conversion program processes more than one stereo image, in many cases, concurrently because in a video sequence (without editing cuts) each frame is very similar to the nearby or sequentially adjacent frames, and, as a result, the conversion program can be adapted to work with sets of or "moving averages" of information when performing the conversion process.

For example, the input stereo stream may be made up of 30 stereo frames per second in video, and it may be desired to generate 12 views (the multi-view set is made up of 12 image/views) from each of these stereo frames (pairs of left and right eye views/images). The output of the conversion program is 30 sets of views/frames for interlacing (e.g., F1.1 . . . F1.12, F2.1 . . . F2.12, and so on up to F30.1 . . . F30.12). This may be thought of as a matrix of views generated by the conversion program. Since there is some data extrapolation, the conversion program when processing video may take into consideration that one image/view in one frame may be similar to an image/view in an adjacent or nearby frame (e.g., F3.5 may be very similar to F4.5), when extrapolating the data and calculating the depth maps.

With this in mind, the inventors recognized that one idea may be to find matching pixels from frame-to-frame (over time and not just in terms of stereo matching). Then, the conversion program may ensure that the depth of these matching pixels is similar (i.e., time coherence is maintained). Such determination and verification of time coherence between matching pixels allows the conversion program to do a better job of estimating the depth, while at the same time ensuring there are no huge jumps or discrepancies as the video is later played or displayed via a 3D display device.

Now, it may be helpful to discuss image display at the pixel level. By using an appropriate combination of red (R), green (G), and blue (B) intensities, many colors can be displayed. Discrete combinations of R, G, and B values are allowed in typical display devices, which provide millions of different (though not necessarily distinguishable) hues, saturations, and lightness shades. There are even different technologies that display RGB pixels using subpixels. An LCD monitor typically has a refresh rate of 60 Hz, which means that the image is re-drawn every 16.67 ms.

There are two main methods used to refresh the pixels and redraw the image on the screen: progressive scan and interlacing. Progressive scan delivers a sharper picture as the television/monitor displays each line of pixels sequentially. Interlacing alternates the odd lines of pixels with the even lines, changing them so quickly that the viewer sees a cohesive image. Progressive scan is one of two methods used for "painting" an image on a television/monitor screen where the lines are drawn in one at a time in sequential order. The entire single frame image is painted every $\frac{1}{60}^{th}$ of a second, allowing for twice the detail to be sent in the same amount of time used in interlaced systems. Progressive scanning results in a more detailed image on the screen and is also less susceptible to the flicker commonly associated with interlaced scanning. Because of the way the pixels are displayed and refreshed in the screen, the conversion program can use the lenses on top of the screen to match the angle of the RGB pixels arrangement.

Figure 9:
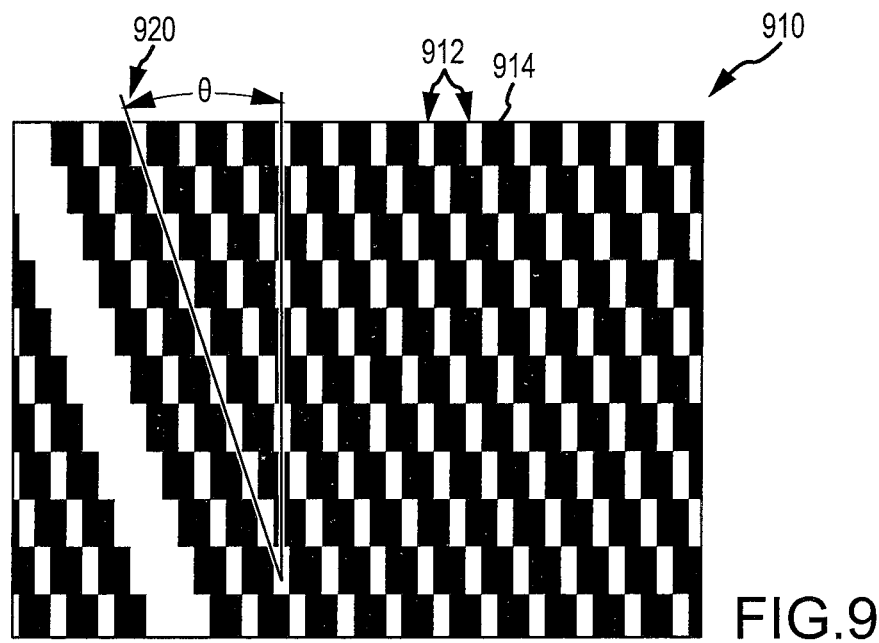
FIGS. 9 and 10 illustrate schematically displays/screens adapted for 3D display showing lens direction and width and use of the screen/display to concurrently show or display 9 images (e.g., the multi-view set of images may include 9 views or images from differing viewpoints or viewing angles)

FIG. 9 illustrates a portion of display screen 910 showing rows 912 of RGB pixels 914. In an exemplary arrangement with 1080p definition, there are 1080 lines of vertical resolution. Line 920 illustrates a lens direction relative to vertical to be 18.435 degrees (shown as angle, θ, in FIG. 9). If one assumed a 16:9 aspect ratio in the diagram/screen 910, there would be 1920 lines of horizontal resolution or 2,073,600 pixels (1920 multiplied by 1080).

Figure 10:
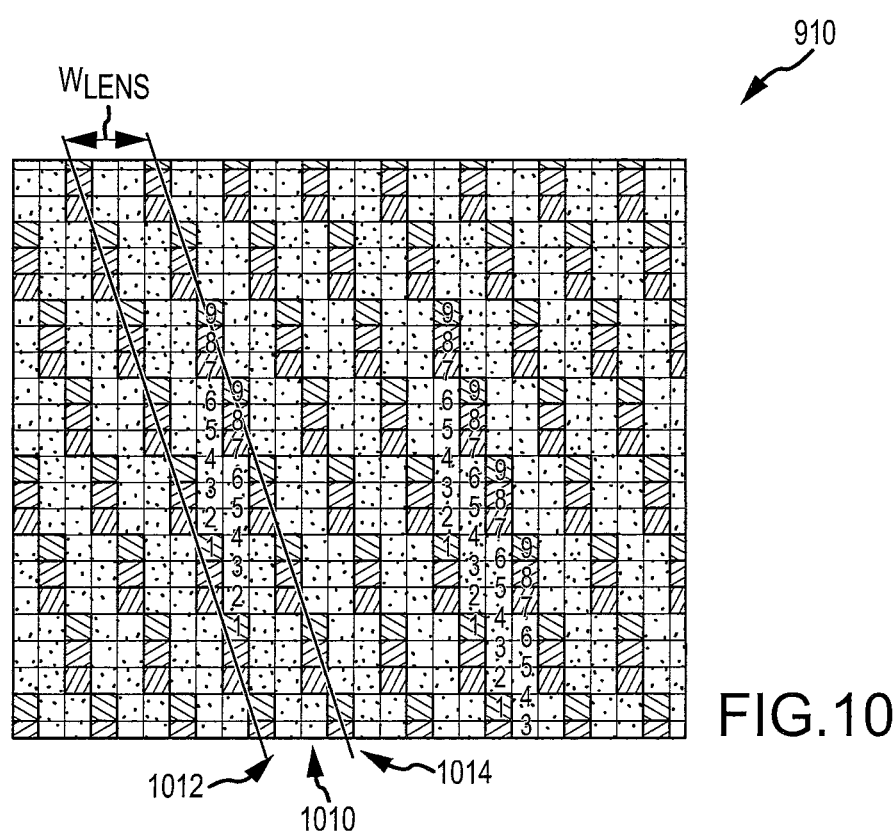

There is a direct relationship between the lens width (or lens per inch (LPI)) used on top of the screen and the screen resolution. FIG. 10 shows a modified display screen 910, with lines 1012 and 1014 showing the outer boundaries or width, $w_{lens}$, of the lens 1010 of the 3D display with screen 910. In the exemplary display screen 910, the lens 1010 can display 9 frames or images. In the diagram of FIG. 10, each number 1 represents one pixel of frame number one while each number 2 represents the pixels of frame number two, and so on until frame number six, which match the size of the lenses 1010 applied on the screen in an 18.435 degree angle, θ.

At this point, it may be useful to discuss the concept of time coherence, which is concerned with the way the conversion program takes into account the fact that it is not just working with a single stereo image. The conversion program acts to generate a depth map and from that the needed frames with more parallax can be generated. In this case, the system may know that, for instance that frame 5 is very similar to frame 6, but, on a video sequence, the system/conversion program also may take into account the fact that frame 6 at time 10 is very similar to frame 6 from times 9 and 11.

When discussing video stereo content (e.g., a sequence of stereo images where each one has to be converted to several views that finally will generate a sequence of interlaced files or images to finally be displayed on the screen), the conversion program takes into account processing more than one stereo image at the same time. This is desirable because in a video sequence (without editing cuts) each frame is very similar to the nearby frames, so that it is desirable or useful to work with groups or "moving averages" of information.

For example, the conversion program may take as input 3D video with 30 stereo frames per second, and the conversion program may be set to generate 12 views from each of these frames or stereo images. With the conversion program, a matrix of frames ("F") is created: Row 1: F1.1, F1.2, F1.3 . . . F1.12; Row 2: F2.1, F2.2, F2.3 . . . F2.12; and so on up to Row 30: F30.1, F30.2, F30.3 . . . F30.12. This is a matrix of views generated by the conversion program, but, since there is some data extrapolation, for video input, the conversion program takes into consideration that, for instance, F3.5 is very similar to F4.5 (nearby or adjacent frames in the video input) when it extrapolates the data.

In a single stereo image, the conversion program generates the depth map considering just the two images of the single stereo image (right and left images). From there, the conversion program generates the set of needed views, but it also takes into account that F3 is similar to F4 (in this example).

Further, when considering processing of video input, it is also useful to consider that F3.5 is very similar to F4.5 since they are in the same viewing angle but on a very close and consecutive instant in time. The idea is to find matching pixels from frame-to-frame (over time and not in terms of stereo matching). Then, the conversion program can ensure that the depth of these pixels is similar (time coherence), and, thus, the conversion program can do a much better job of estimating the depth while, at the same time, ensuring there are no huge jumps/discrepancies as the video is later played.

With regard to interlacing for 3D screens (3D display devices may have a monitor with a barrier grid or a lenticular lens array), it may be useful to remember that in traditional lenticular there is a basic relationship between the resolution (dots per inch (DPI)), the sizes of the lenses (lenses per inch (LPI)), and the number of frames that is possible to print or display underneath the lenses/lenticules (e.g., maximum number of frames=DPI/LPI). For example, using a 240 LPI lens sheet and a 1200 DPI device, the maximum number of frames is 1200/240 or 5. This relationship between the resolution, number of frames, and lens size creates a big restriction or challenge in developing thinner lenses or higher numbers of frames with a low resolution device.

Figure 15:
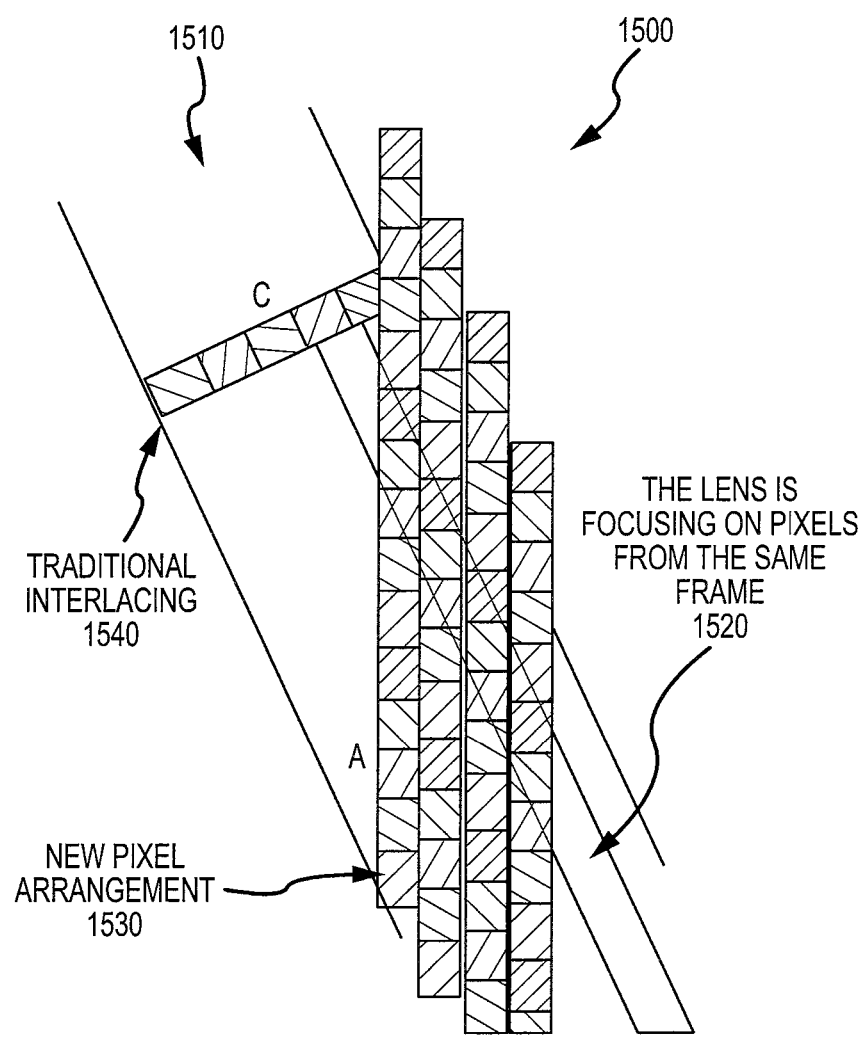
FIG. 15 is a partial 3D display screen shot showing an angled lens and a pixel arrangement for providing interlacing according to one embodiment of the present description.

FIG. 15 illustrates a graph (or partial screen shot at the pixel level) 1500 showing an angled lens 1510. Line 1520 is useful for showing the lens 1510 is focusing on pixels from the same frame. At 1540, a partial example of traditional interlacing is provided. In contrast, a partial example of the new pixel arrangement is shown at 1530. On a monitor, the resolution in terms of DPI is relative low for the use of lenticular. In a 1080p monitor, the equivalent DPI is about 90 DPI meaning that a lenticular lens array may be used that is around 40 LPI in a slant direction to match the pixels and the pixel replacement in the screen.

The image 1500 of FIG. 15 shows that the sequences of frames in a vertical position with the new pixel arrangement. This is not the traditional lenticular interlacing system, which is shown at 1540. Each pixel (with differing shading/pattern) represents a different frame in FIG. 15. Hence, if the lens 1510 is focusing as shown with line 1520, the diagram 1500 shows how the lens 1510 is focusing on pixels that belong to the same frames.

Figure 16:
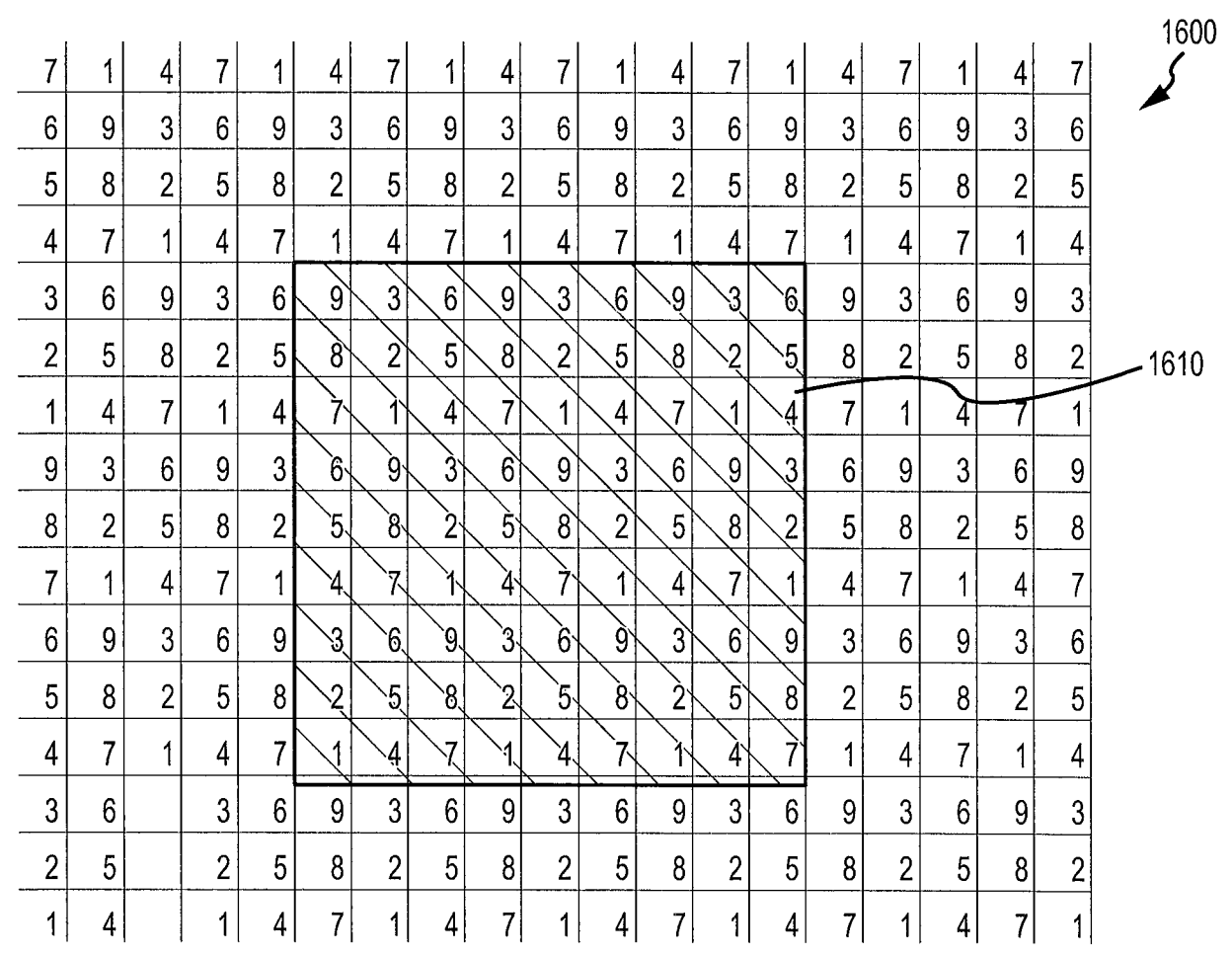

Referring again to FIG. 10, the graph/pixel level view 910 shows the actual position for a 9-frame sequence that may be used to generate/display a 3D image. FIG. 16 illustrates a matrix 1600 that would be provided if all the pixels were filled with numbers (1 to 9). In order to display the 3D image with this pixel arrangement, the conversion program may be configured to (or include additional software/routines) use the way the pixels are refreshed in the screen 1600 or one can use a method for interlacing these images.

In such a method, the interlacing may include displaying and replacing the additional images at a pixel level at an angle and position relative to pixel flow and replacement on a screen of the monitor, whereby the additional images are viewable by an observer of the monitor with frames in an order to be viewed in 3D. In such an interlacing method, pixels of the interlaced additional images are displayed and replaced at one or more of the following angle ranges: negative to positive 3 degrees relative to vertical, negative 13 to 16 degrees to positive 13 to 16 degrees relative to vertical, negative 17 to 19 degrees to positive 17 to 19 degrees relative to vertical, and negative 24 to 28 degrees to positive 24 to 28 degrees relative to vertical. In some cases, the interlaced additional images are provided in multiples of 16 for angles in the range of negative 13 to 16 degrees to positive 13 to 16 degrees relative to vertical. While in other cases, the interlaced additional images are provided in multiples of 9 for angles in the range of negative 17 to 19 degrees to positive 17 to 19 degrees relative to vertical. While in still other cases, the interlaced additional images are provided in multiples of 6 for angles in the range of negative 24 to 28 degrees to positive 24 to 28 degrees relative to vertical.

This may mean that interlacing software/techniques for a regular lenticular lens array may be used but in a very different way. Looking at the matrix 1600 of pixels in FIG. 16, there is a 9 by 9 submatrix 1610 that is repeated throughout the image/matrix 1600. Hence, in order to generate the full image that can be displayed in the 3D screen (with a lenticular lens array or grid barrier), the interlacing method preferably interlaces the frames in the sequence that each row represents and then interlaces those files in the horizontal direction.

For example, the conversion program may take the first row of the submatrix 1610 and interlace frames 9, 3, 6, 9, 3, 6, 9, 3, 6 that will generate an interlaced file (I1). Then, the conversion program may take the second row and interlace frames 8, 2, 5, 8, 2, 5, 8, 2, 5 to generate a second interlaced file (I2). This process may be repeated until frames 1, 4, 7, 1, 4, 7, 1, 4, 7 of the last row are interlaced to generate the ninth interlaced file (I9). Finally, the sequence of interlaced files (I1 to I9) is input in the interlacer software/subroutine, but this time with horizontal interlacing. The result is a file that has the pixel arrangement like that described in the matrix 1600 above that will fit the angle of the lenses of the 3D display device (or its screen) and also the resolution of the screen.

The conversion program is also adapted in some embodiments to be user-friendly and allow operators of a workstation (such as workstation 805 of FIG. 8) or other computing device/system to work with existing stereo content to generate a set of multi-views from each input stereo frame (e.g., each left and right eye frame that together provide convention 3D displays). With this in mind, it may be useful to discuss operation of the conversion program via an exemplary GUI. The conversion program (e.g., as shown at 804 in FIG. 8) may be configured to generate a user interface to allow an operator/user to work with existing stereo content/media in a "manual" or step-by-step process.

Figure 11:
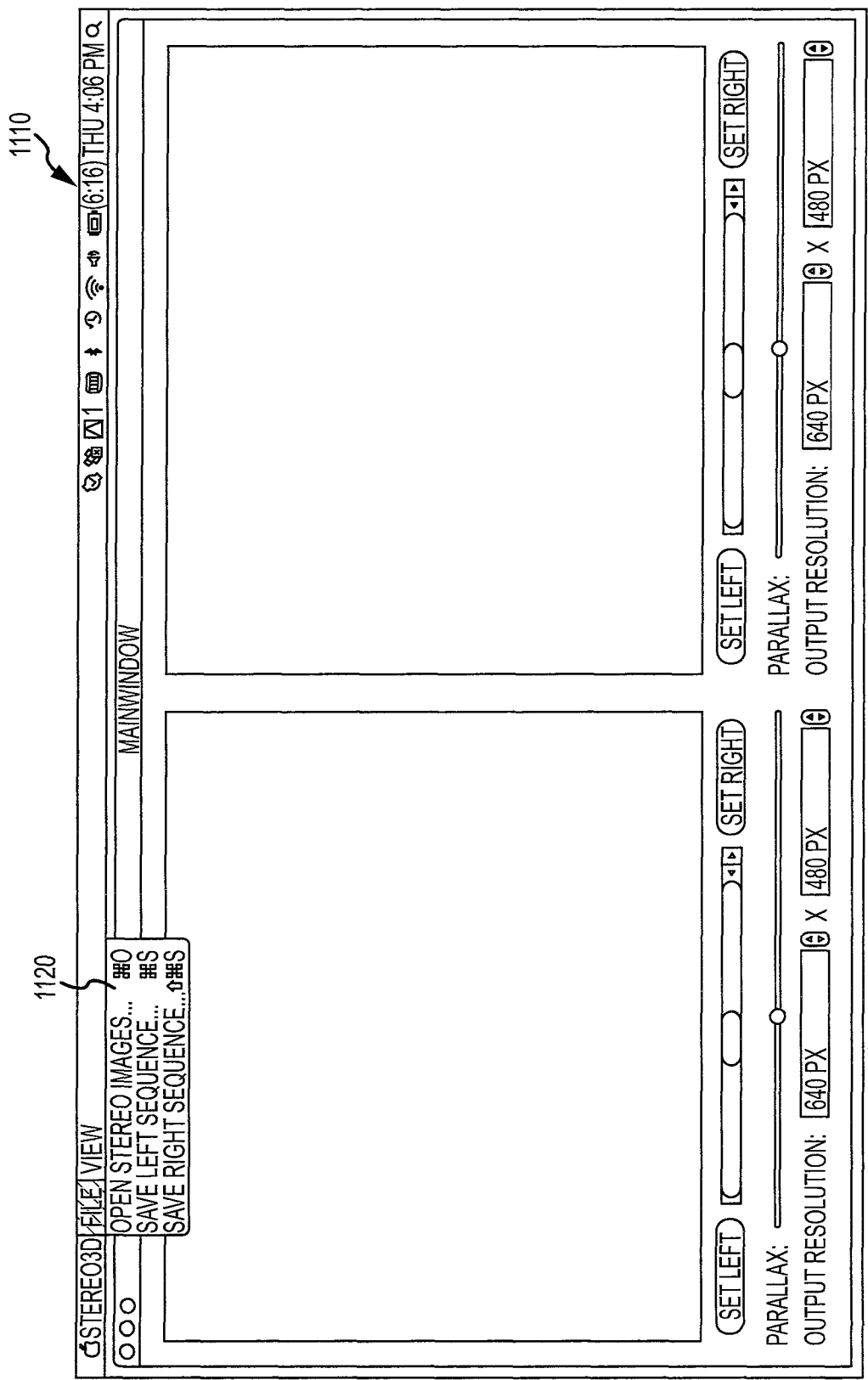
FIGS. 11-14 illustrate a number screen shots of an exemplary user interface that may be generated by the conversion program to allow an operator to convert stereo content to multi-view content for display on a 3D display device.

In order to work with stereo video (for example), the conversion program or software suite has the capability to process a batch of stereo images (video) after inputting one or more settings on a first or single image (pair of left and right eye images/frames) that are applied to the entire batch or set of stereo images. FIG. 11 illustrates a first screen shot 1110 of the GUI provided by the conversion program on a monitor/display of a workstation/computing device. As shown, the GUI provides a left image portion 1112 and a right image portion 1116, which allows each of the two stereo images/frames to be displayed (once retrieved) and to provide user-input or selectable conversion parameters (such as parallax and output resolution). Further, as shown with pull down menu 1120, the user may select stereo images to open from accessible memory or media (nearly any source of stereo content) and may also choose to save the left and/or right sequences (set of left eye and set of right eye images).

Figure 12:
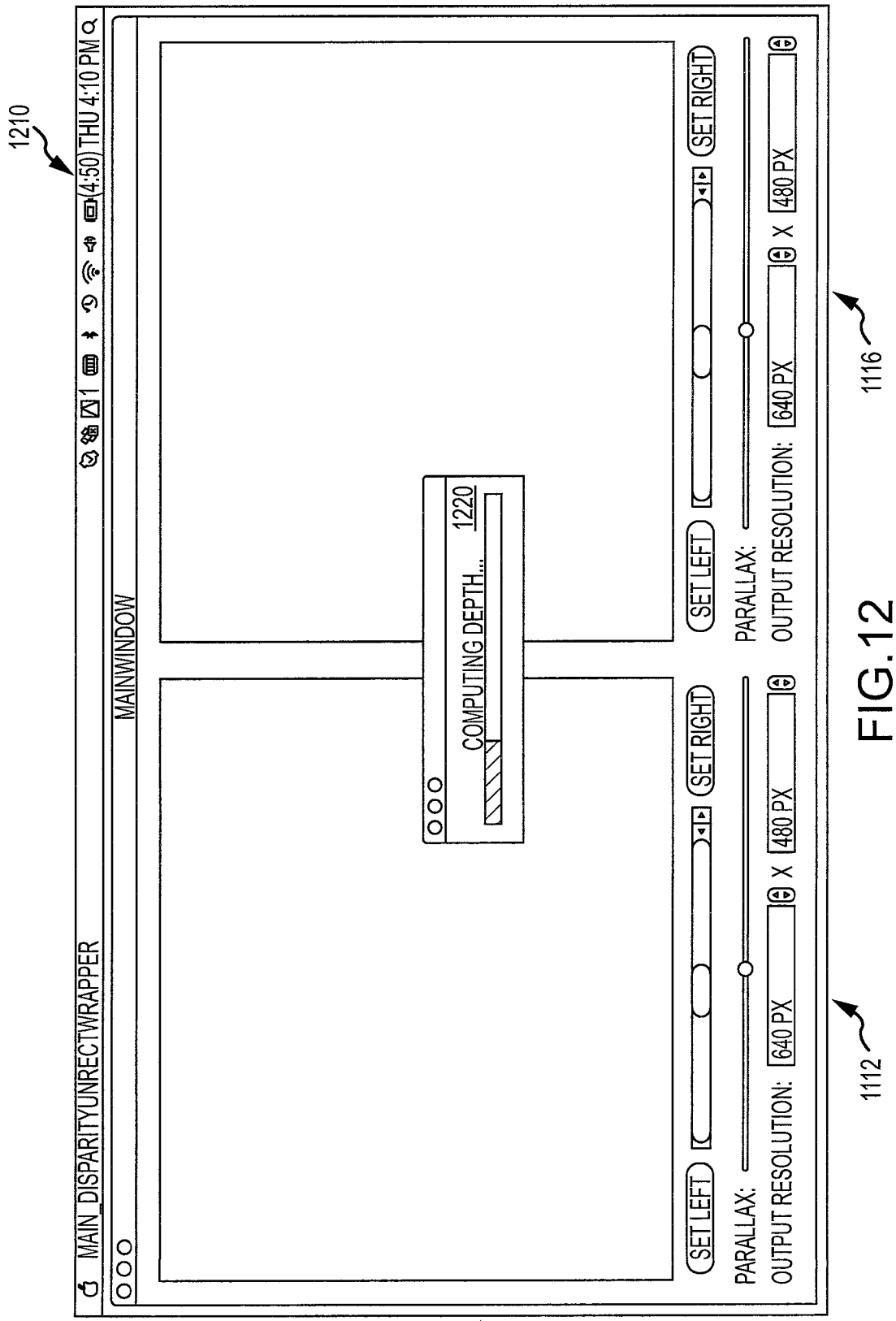

Once the stereo image (sequence) is chosen, the GUI may indicate that the conversion program is reading or inputting the selected stereo image sequence (or at least the first image pair in the 3D sequence). Then, as shown in FIG. 12 with screen shot 1210, the conversion program indicates to the operator that the per-pixel depth is being calculated and its progress in real time (see pop up box 1220). In other words, conversion program is automatically running algorithms as needed in order to generate the depth maps for each picture (e.g., each left and right image of each frame in the video sequence).

Once the depth maps are generated and, at least temporarily, stored in memory accessible by the conversion program, the conversion program displays the original stereo images. This can be seen in FIG. 13 with screen shot 1310 of the GUI. The GUI includes in the left image portion 1112 an image display window 1330 in which the original left eye or left camera image 1331 is displayed, and the GUI further includes in the right image portion 1116 an image display window 1340 in which the original right eye or right camera image 1341 is displayed.

In some images 1331, 1341, the different points of view may not be noticeable to the naked eye or may be more noticeable in isolated portions due to particular image objects or elements (which the conversion program may identify and "cut out" from the image as discussed above). For example, the images 1331, 1341 may include a wall at an angle in the background portion of the scene and its "movement" from image 1331 to image 1341 (or vice versa) may be readily identified in the screen shot 1310 of the conversion program GUI.

Figure 13:
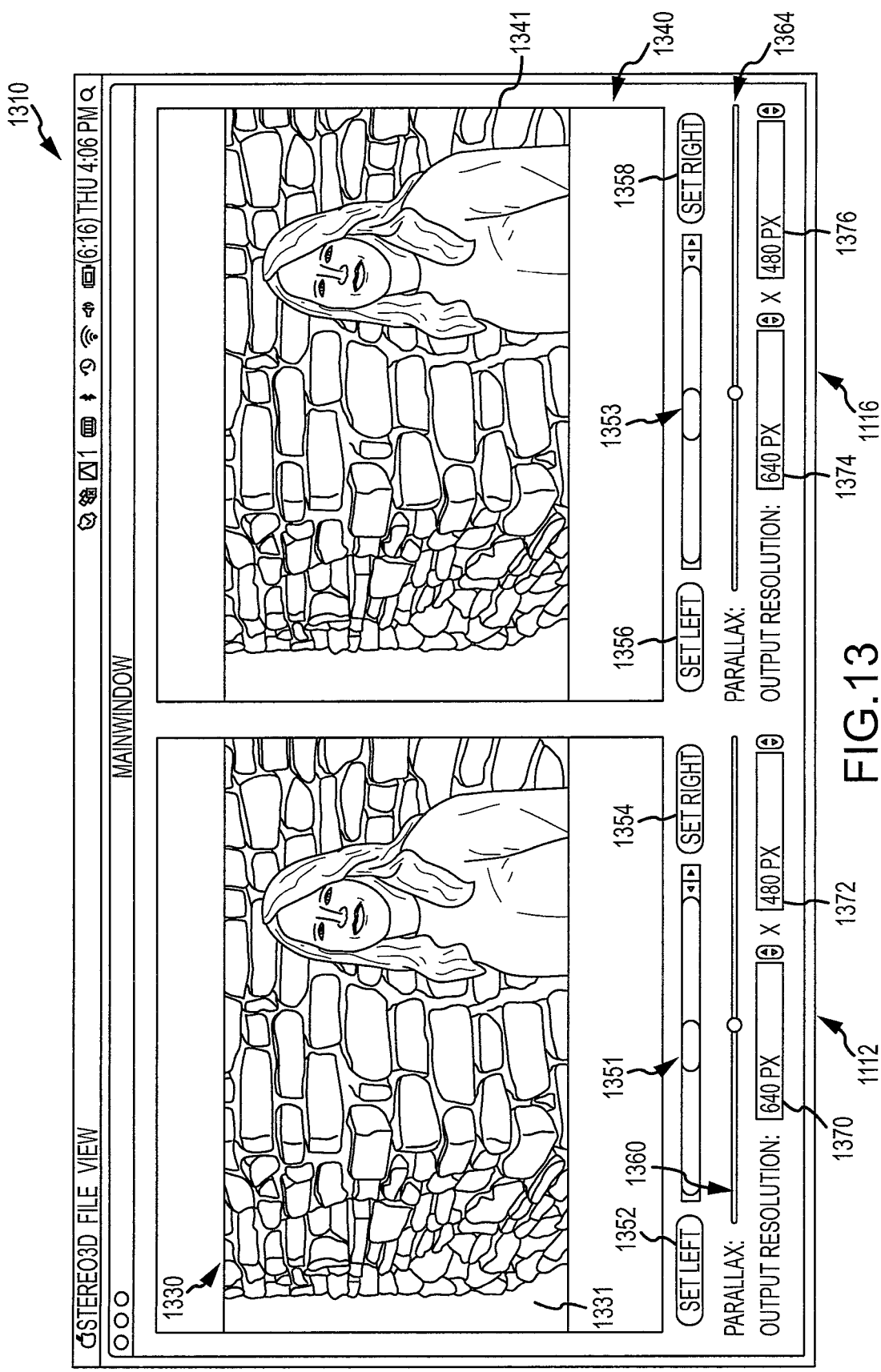

At this point in the conversion process, the operator may input additional information in order to generate the multiple views or set of frames from the original stereo input. As shown in FIG. 13, the user may choose the left or right image for used in generating the multiple views or sequence of multi-view frames. The user/operator of the GUI may also input or change the parallax used for the sequence generation, such as by moving slide bar 1360 or 1364, and also set the output resolution in input boxes 1370, 1372, 1374, 1376. Alternatively, the user may choose to accept the default values of these conversion method parameters. The same input buttons/slide bars/boxes are provided for both the left and right images 1331, 1341, and the conversion program has already generated the depth map for both images such that either image 1331, 1341 may be selected/used for the generation of additional views or sequences of frames with multi-views. In some embodiments, the conversion program may select a preferred one of the images based on one or more parameters that may indicate that image 1331 or 1341 may work better for the conversion process.

Figure 14:
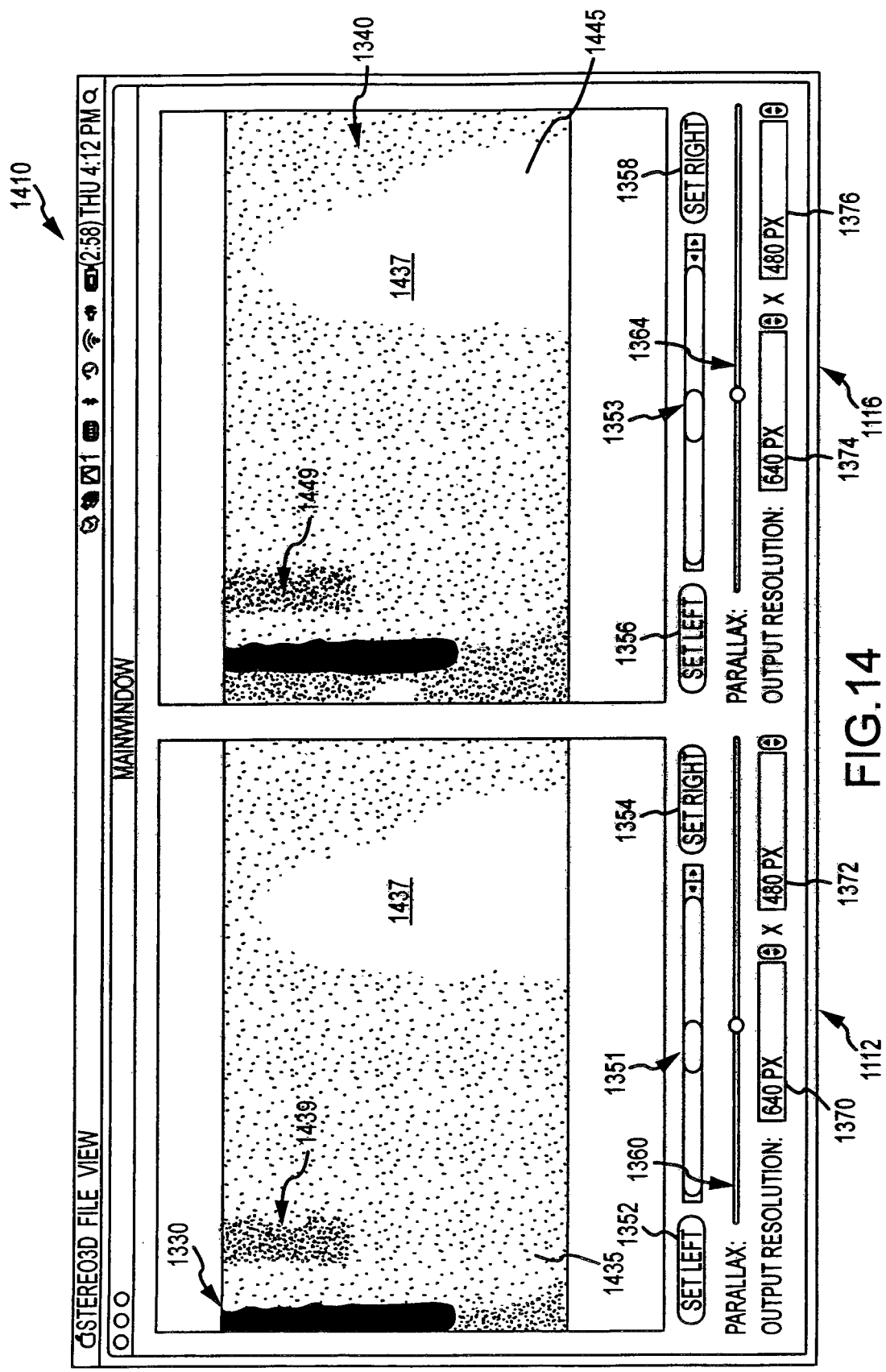

In some embodiments of the conversion program, the GUI may be operated to display the generated depth maps for the left and right images 1331, 1341. For example, FIG. 14 illustrates a screen shot 1410 in which the left image display window 1330 is updated to display the actual depth map 1435 generated by the conversion program for the left image 1331 and in which the right image display window 1340 is updated to display the actual depth map 1445 generated by the conversion program for the right image 1341.

The clear/white pixels (such as those in areas 1437 and 1447) are "near" to the camera/viewer or are associated with foreground objects/elements while the dark/black pixels (such as those in areas 1439 and 1449) are "far" away from the camera/viewer or are associated with background objects/elements in the scene shown by images 1331, 1341. In some implementations, the conversion program may use only a portion (such as 25 percent) of the resolution to generate the depth maps 1435 and 1445, and even with the lower amount of data, the conversion program can provide a very accurate position for each pixel in the image 1331, 1341 of an input stereo scene.

To create the multiple views, the operator may simply move the slide bars 1351, 1353 to show a preview of the image with differing extreme frames/views, and, once a desired extreme right and left frame is found, the user may choose the buttons 1352, 1354, 1356, and 1358 (as appropriate) to set or lock the extreme frame value. These extreme right and left values are useful for setting the outer right and left boundaries for creating the additional views (see left and right boundary lines 352, 354 in FIG. 3 useful for setting the viewing angle range (e.g., 30 to 120 degrees, 45 to 135 degrees, or the like relative to the vertical plane of the display screen or the focal plane) for generating the additional views from the stereo input images). In use, the operator moves the bar 1351 or 1353, and the conversion software shows a preview of the image or view at that viewing angle, and the user may click on the "set left" button 1352, 1356 or the "set right" button 1354, 1358 when the displayed image is acceptable/desired for the user. This sets the first and last frame/view for the conversion software.

In some embodiments, the slide bar 1360, 1364 for the parallax may be adjusted by the user to adjust the parallax in the generated multi-views/additional views. The parallax setting may be used by the conversion program to automatically adjust the distribution of the total parallax, which may mean more to the front or foreground portion of the additional views and less for back or background portion (or vice versa). These are exemplary types of conversion parameter selections that a final user or viewer may input such as when they are converting a stereo input or even when they are viewing a 3D video generated according to the present description with the conversion program. In this manner, the generated 3D content or viewing experience may differ in one or more aspects for different operators, for different input content, and/or for differing 3D display devices (viewing spaces). For example, a user may select may select more or less 3D by moving the slide bars 1351, 1353 (to define the outer (or left/right) view or viewing angles) and/or select the type of 3D image/effect by choosing less or more parallax distribution (by moving slide bar 1360, 1364).

Regarding generating and saving the multi-view sequence (or frames each with 12 to 40 or more images/view), the user may further define the sequence by inputting (such as via a pop up box or the like presented in the GUI) the number of views or images to generate per stereo image (each view may also be thought of as a new frame as the left and right eye frames provided by a camera may be provided as input such that instead of two frames the output content may include 12 to 40 or even up to a 100 or more frames/views per stereo image input into the conversion program). This may be also be a default setting due to the user-selected output resolution or based on the monitor resolution of the 3D display device to be used to display the 3D content. Depending on the monitor, for example, the frames resolution can also be a default setting, but in the shown GUI, the user may enter/adjust this at 1370, 1372, 1374, 1376.

The views or frames associated with each stereo image input (each pair of right and left images) generated by the conversion program may be saved in memory such as in a folder. Then, the views/frames in the folder may be input to an interlacer program or module of the conversion program to perform the final interlacing process. The interlacer program/module may take the form of a presently available software program such that further explanation of this module is not provided as it will be readily understood by those skilled in the art.

To get an automated process/functionality, the conversion program may be adapted to generate the set of views/frames for each stereo image of an input 3D video/movie content and then provide this set of views/frames to the interlace routine/software to generate the interlaced image made up of multi-views for display on a 3D display device (e.g., a monitor with a barrier grid or lenticular lens array). For example, this may mean that if one were to use 24 frames per second video, the conversion program would have as input 24 stereo images per second and the output content from the conversion program would be 24 sets of multi-views or frames (e.g., with a user-selected or default number of views with a desired or default amount of 3D and parallax) that have been interlaced by an interlace program or routine.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

As described, a conversion program or software suite (computer readable code stored on media accessible by a processor or microchip processors) is described that can effectively function to convert a stereo image or series of stereo images into a 3D image or video with multiple views that can be viewed on a 3D display device (e.g., one with a lenticular lens array or sheet or with a barrier grid). The conversion program may be adapted to read all or most stereo media (receive a variety of input or 3D content). The conversion program may act to reverse or neutralize the anaglyph, if needed, and return the 3D content or stereo image input to the program to a traditional stereo view (left and right eye images for each frame of the input).

The conversion program may function to read and align the stereo views in an overlay. In this regard, the conversion program may digitally overlay the right and left eye image and then determine the pixels of the image that are in the foreground (in front of the focal plane) and in the background (behind the focal plane). The conversion program identifies the individual elements or objects in the frames and cuts them out or defines a boundary for each of them at the digital level or pixel level (e.g., a set of pixels is associated with each object/element of a 3D image input to the conversion program).

The program then creates additional views (multi-views) at predetermined (or predefined) angles and at a predetermined number (e.g., 40 views going outward from the base or original stereo zone by 30 to 45 degrees on either side (or 20 new or additional views on either side of the original 2 stereo images)). The conversion program exaggerates and creates outside views (relative to the boundaries of the original stereo images) in addition to inside views (additional views between the two input images from left and right camera lenses). To fill holes and gaps in the additional views, the conversion program automatically may clone and/or stretch the backgrounds or adjacent image elements/pixels to fill in the gaps/holes (which were created by moving the program-selected objects/elements appropriately (left or right) pursuant to the pixel information and desired effect (background or foreground objects/elements)).

All the views are then interlaced by the conversion program to create a frame or view with up to over 100 views (images from differing viewing angles) or 12 to 40 in some applications. The conversion program allows selection of the parallax by the operator/user of the program before or during the conversion method/process for an input stereo image or 3D video. In some cases, the conversion program generates a user interface that allows the viewer/operator to adjust the optical pitch to the desired viewing distance for the room in which the 3D display device is used to display the multi-view output of the conversion program, and, in some cases, the optical pitch can be adjusted to suit the 3D display device (its barrier grid or lenticular lens array) at the time of loading the 3D media (output of the conversion program).

The input to the conversion program may vary significantly to practice the invention. For example, the conversion program may be able to accept or read traditional file media including existing DVDs and broadcast information to process a video, animated movie, video game imagery, or the like with stereoscopic images to create a multi-view image set (plurality of frames with 10 to 40 or more interlaced images) for display on a 3D display device.

In some embodiments, the conversion program may take a mono image as input and convert it into a stereo image at an angle greater than 20 degrees of separation using pixels and perspective to create the depth map. This may include images that are more than 45 degrees apart. The stereo image that is created then runs through the same process as discussed above to create up to more than 100 views but more typically 20 to 40 views per frame (e.g., each frame of an output 3D movie or video would have 20 to 40 interlaced views).

We claim:

1. A method of generating additional views from a stereo image, comprising:

executing a conversion module with a computer processor;

with the conversion module, receiving as input at least one stereo image of one or more scenes, wherein each stereo image includes a left image associated with a left camera and a right image associated with a right camera;

for each of the stereo images, generating a plurality of additional images of the one or more scenes with the conversion module, wherein the generating comprises identifying objects in the one or more scenes that are in a foreground and in a background relative to a focal plane of the right and left cameras and wherein the generating involves moving the identified objects from positions in the left and right images to new positions in the additional images based on whether the identified objects are in the foreground or in the background; and interlacing the plurality of additional images for each of the stereo images to generate a 3D content comprising multiple views of the one or more scenes for each of the stereo images, wherein the generating includes identifying a hole in one of the additional images and repairing the identified hole, wherein the interlacing is performed such that the generated 3D content is displayable on a 3D display device including a barrier grid or a lenticular lens array on or associated with a monitor, wherein the interlacing comprises displaying and replacing the additional images at a pixel level at an angle and position relative to pixel flow and replacement on a screen of the monitor, whereby the additional images are viewable by an observer of the monitor with frames in an order to be viewed in 3D, and wherein pixels of the interlaced additional images are displayed and replaced at one or more of the following angle ranges: negative to positive 3 degrees relative to vertical, negative 13 to 16 degrees to positive 13 to 16 degrees relative to vertical, negative 17 to 19 degrees to positive 17 to 19 degrees relative to vertical, and negative 24 to 28 degrees to positive 24 to 28 degrees relative to vertical.

2. The method of claim 1, wherein the plurality of additional images includes at least 12 frames providing views of the one or more scenes from differing viewing angles than provided by the left and right cameras.

3. The method of claim 2, wherein the differing viewing angles define an amount of 3D provided by the generating step and are viewing angles outside of a zone defined by the viewing angles of the left and right cameras.

4. The method of claim 3, wherein the differing viewing angles are selected from the range of 30 to 150 degrees relative to a focal plane.

5. The method of claim 1, wherein the generating uses a user-selected amount of parallax to create the plurality of additional images.

6. The method of claim 1, further comprising determining a depth map providing a depth of each pixel in each of the stereo images, wherein the generating is performed based on the depth map.

7. The method of claim 1, wherein the input comprises a 3D movie or a 3D animated video comprising 20 to 24 frames per second, the frames each providing a pair of the left and right images for the one or more scenes.

8. The method of claim 1, wherein the input includes anaglyph information and the method includes, prior to the generating step, processing input convert the anaglyph information into the left and right images.

9. A method of generating additional views from a stereo image, comprising:
   executing a conversion module with a computer processor;
   with the conversion module, receiving as input at least one stereo image of one or more scenes, wherein each stereo image includes a left image associated with a left camera and a right image associated with a right camera;
   for each of the stereo images, generating a plurality of additional images of the one or more scenes with the conversion module; and
   interlacing the plurality of additional images for each of the stereo images to generate a 3D content comprising multiple views of the one or more scenes for each of the stereo images,
   wherein the generating includes identifying a region of missing pixels in one of the additional images and providing the missing pixels in the region by stretching or enlarging an object adjacent to the region,
   wherein the interlacing is performed such that the generated 3D content is displayable on a 3D display device including a barrier grid or a lenticular lens array on or associated with a monitor,
   wherein the interlacing comprises displaying and replacing the additional images at a pixel level at an angle and position relative to pixel flow and replacement on a screen of the monitor, whereby the additional images are viewable by an observer of the monitor with frames in an order to be viewed in 3D, and
   wherein pixels of the interlaced additional images are displayed and replaced at one or more of the following angle ranges: negative to positive 3 degrees relative to vertical, negative 13 to 16 degrees to positive 13 to 16 degrees relative to vertical, negative 17 to 19 degrees to positive 17 to 19 degrees relative to vertical, and negative 24 to 28 degrees to positive 24 to 28 degrees relative to vertical.

10. The method of claim 9, wherein the interlaced additional images are provided in multiples of 16 for angles in the range of negative 13 to 16 degrees to positive 13 to 16 degrees relative to vertical, wherein the interlaced additional images are provided in multiples of 9 for angles in the range of negative 17 to 19 degrees to positive 17 to 19 degrees relative to vertical, wherein the interlaced additional images are provided in multiples of 6 for angles in the range of negative 24 to 28 degrees to positive 24 to 28 degrees relative to vertical.

11. The method of claim 9, wherein the plurality of additional images includes frames providing views of the one or more scenes from differing viewing angles than provided by the left and right cameras, wherein the differing viewing angles define an amount of 3D provided by the generating step and are viewing angles outside of a zone defined by the viewing angles of the left and right cameras, wherein the differing viewing angles are selected from the range of 30 to 150 degrees relative to a focal plane.

12. The method of claim 9, wherein the generating uses a user-selected amount of parallax to create the plurality of additional images.

13. The method of claim 9, further comprising determining a depth map providing a depth of each pixel in each of the stereo images, wherein the generating is performed based on the depth map and further comprising identifying objects in the one or more scenes that are in a foreground and in a background relative to a focal plane of the right and left cameras based on the depth map, wherein the generating involves moving the identified objects based on whether the identified objects are in the foreground or in the background.

14. A method of generating additional views from a stereo image, comprising:
   executing a conversion module with a computer processor;
   with the conversion module, receiving as input at least one stereo image of one or more scenes, wherein each stereo image includes a left image associated with a left camera and a right image associated with a right camera;
   determining a depth map providing a depth of each pixel in each of the stereo images;
   for each of the stereo images, generating a plurality of additional images of the one or more scenes with the conversion module based on the depth map;
   identifying objects in the one or more scenes that are in a foreground and in a background relative to a focal plane of the right and left cameras based on the depth map, wherein the generating involves moving the identified objects from positions in the left and right images to new positions in the additional images based on whether the identified objects are in the foreground or in the background; and
   interlacing the plurality of additional images for each of the stereo images to generate a 3D content comprising multiple views of the one or more scenes for each of the stereo images,
   wherein the interlacing is performed such that the generated 3D content is displayable on a 3D display device including a barrier grid or a lenticular lens array on or associated with a monitor,
   wherein the interlacing comprises displaying and replacing the additional images at a pixel level at an angle and position relative to pixel flow and replacement on a screen of the monitor, whereby the additional images are viewable by an observer of the monitor with frames in an order to be viewed in 3D, and
   wherein pixels of the interlaced additional images are displayed and replaced at one or more of the following angle ranges: negative to positive 3 degrees relative to vertical, negative 13 to 16 degrees to positive 13 to 16 degrees relative to vertical, negative 17 to 19 degrees to positive 17 to 19 degrees relative to vertical, and negative 24 to 28 degrees to positive 24 to 28 degrees relative to vertical.

15. The method of claim 14, wherein the interlaced additional images are provided in multiples of 16 for angles in the range of negative 13 to 16 degrees to positive 13 to 16 degrees relative to vertical, wherein the interlaced additional images are provided in multiples of 9 for angles in the range of negative 17 to 19 degrees to positive 17 to 19 degrees relative to vertical, wherein the interlaced additional images are provided in multiples of 6 for angles in the range of negative 24 to 28 degrees to positive 24 to 28 degrees relative to vertical.

16. The method of claim 14, wherein the plurality of additional images includes frames providing views of the one or more scenes from differing viewing angles than provided by the left and right cameras, wherein the differing viewing angles define an amount of 3D provided by the generating step and are viewing angles outside of a zone defined by the viewing angles of the left and right cameras, wherein the differing viewing angles are selected from the range of 30 to 150 degrees relative to a focal plane.

17. The method of claim 14, wherein the generating uses a user-selected amount of parallax to create the plurality of additional images.

18. A method of generating additional views from a stereo image, comprising:

executing a conversion module with a computer processor;

with the conversion module, receiving as input at least one stereo image of one or more scenes, wherein each stereo image includes a left image associated with a left camera and a right image associated with a right camera;

for each of the stereo images, generating a plurality of additional images of the one or more scenes with the conversion module; and interlacing the plurality of additional images for each of the stereo images to generate a 3D content comprising multiple views of the one or more scenes for each of the stereo images, wherein the interlacing is performed such that the generated 3D content is displayable on a 3D display device including a barrier grid or a lenticular lens array on or associated with a monitor, wherein the interlacing comprises displaying and replacing the additional images at a pixel level at an angle and position relative to pixel flow and replacement on a screen of the monitor, whereby the additional images are viewable by an observer of the monitor with frames in an order to be viewed in 3D, and wherein pixels of the interlaced additional images are displayed and replaced at one or more of the following angle ranges: negative to positive 3 degrees relative to vertical, negative 13 to 16 degrees to positive 13 to 16 degrees relative to vertical, negative 17 to 19 degrees to positive 17 to 19 degrees relative to vertical, and negative 24 to 28 degrees to positive 24 to 28 degrees relative to vertical.

19. The method of claim 18, wherein the interlaced additional images are provided in multiples of 16 for angles in the range of negative 13 to 16 degrees to positive 13 to 16 degrees relative to vertical, wherein the interlaced additional images are provided in multiples of 9 for angles in the range of negative 17 to 19 degrees to positive 17 to 19 degrees relative to vertical, wherein the interlaced additional images are provided in multiples of 6 for angles in the range of negative 24 to 28 degrees to positive 24 to 28 degrees relative to vertical.

20. The method of claim 18, wherein the plurality of additional images includes frames providing views of the one or more scenes from differing viewing angles than provided by the left and right cameras, wherein the differing viewing angles define an amount of 3D provided by the generating step and are viewing angles outside of a zone defined by the viewing angles of the left and right cameras, wherein the differing viewing angles are selected from the range of 30 to 150 degrees relative to a focal plane.

21. The method of claim 18, wherein the generating uses a user-selected amount of parallax to create the plurality of additional images.

22. The method of claim 18, wherein the generating includes identifying a hole in one of the additional images and repairing the identified hole, and wherein the identified hole comprises a plurality of missing pixels and the repairing comprises providing the missing pixels by cloning pixels proximate to the missing pixels in the one or more scenes or by stretching or enlarging objects in the left image or the right image adjacent to the missing pixels.

* * * * *